(12) United States Patent
Lu et al.

(10) Patent No.: US 9,515,744 B2
(45) Date of Patent: Dec. 6, 2016

(54) OPTICAL SIGNAL PROCESSING METHOD AND DEVICE

(71) Applicant: Feitian Technologies Co., Ltd., Beijing (CN)

(72) Inventors: Zhou Lu, Beijing (CN); Huazhang Yu, Beijing (CN)

(73) Assignee: FEITIAN TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 14/385,198

(22) PCT Filed: Dec. 25, 2012

(86) PCT No.: PCT/CN2012/087431
§ 371 (c)(1),
(2) Date: Sep. 15, 2014

(87) PCT Pub. No.: WO2014/000400
PCT Pub. Date: Jan. 3, 2014

(65) Prior Publication Data
US 2015/0117870 A1    Apr. 30, 2015

(30) Foreign Application Priority Data

Jun. 29, 2012 (CN) .......................... 2012 1 0223669

(51) Int. Cl.
*H04B 10/60* (2013.01)
*H04B 10/61* (2013.01)
(Continued)

(52) U.S. Cl.
CPC ............ *H04B 10/616* (2013.01); *H04B 10/00* (2013.01); *H04L 1/00* (2013.01)

(58) Field of Classification Search
CPC .................................................. H04B 10/564
See application file for complete search history.

(56) References Cited

U.S. PATENT DOCUMENTS

2005/0213693 A1* 9/2005 Page ................. H04L 7/0008
375/354
2009/0232515 A1* 9/2009 Marien ............... H04B 10/116
398/182
(Continued)

FOREIGN PATENT DOCUMENTS

CN      1631033 A      6/2005
CN    102073996 A      5/2011
(Continued)

OTHER PUBLICATIONS

International Search Report dated Mar. 28, 2013 corresponding to PCT/CN2012/087431 with English translation, 7 pp.

*Primary Examiner* — Shi K Li
(74) *Attorney, Agent, or Firm* — Ohlandt, Greeley, Ruggiero & Perle, LLP

(57) ABSTRACT

Disclosed are a method and device for increasing the adaptability of light intensity, which relate to the field of photoelectric communications. The method comprises: providing several stages of load resistors in the device, the device collecting voltage values, calculating the average value of all the collected voltage values when a preset number of voltage values which meet the requirements are collected, setting a voltage according to the average value and judging whether the set voltage meets preset requirements; and if yes, collecting data according to the set voltage; otherwise switching a load resistor according to a preset rule, wherein the load voltage may affect the voltage collection. The present invention has the beneficial effects of: improving the adaptability of a screen to light intensity during optical signal collection, and at the same time being able to reduce the error rate.

19 Claims, 7 Drawing Sheets

(51) Int. Cl.
 *H04L 1/00* (2006.01)
 *H04B 10/00* (2013.01)

(56) References Cited

U.S. PATENT DOCUMENTS

| | | | | |
|---|---|---|---|---|
| 2009/0238318 A1* | 9/2009 | Song | ............... | H04L 25/068 375/355 |
| 2010/0145713 A1* | 6/2010 | Carroll | ............ | G10L 19/167 704/500 |
| 2010/0284697 A1* | 11/2010 | Bae | ................ | H04B 10/116 398/130 |
| 2013/0331954 A1* | 12/2013 | McConnell | ...... | G06F 15/7842 700/2 |

FOREIGN PATENT DOCUMENTS

| CN | 102387020 A | 3/2012 |
|---|---|---|
| CN | 102497265 A | 6/2012 |
| CN | 102761360 A | 10/2012 |

* cited by examiner

OPTICAL SIGNAL PROCESSING METHOD AND DEVICE

FIELD

The invention relates to the technical field of signal processing, and in particular to a method for processing an optical signal and a device thereof.

BACKGROUND

With the rapid development of e-business and e-bank, the Internet and the mobile communication network are more widely applied in financial transaction or online payment. In most of the transactions, the first step is to authenticate an identity of a person who requests a transaction. Identity authentication technology includes static-password authentication, dynamic-password authentication, biological-characteristic authentication and authentication via a data certificate sent by a third party, etc.

As one of the main authentication technologies, the dynamic password generated in dynamic-password authentication varies each time, thereby avoiding the password from being guessed and cracked, A dynamic token generates a dynamic password according to a static factor and a dynamic factor, where the static factor set in the dynamic token is unchangeable, and the dynamic factor which includes a time factor, times of event and/or a challenge code is changeable. The challenge code in conventional technology is applicable to a contact dynamic token or a non-contact dynamic token, where the challenge code of the contact dynamic token is sent by a host which is connected to the dynamic token, and the non-contact dynamic token transmits the challenge code by acquiring the black and white signals output by the host screen. In the conventional technology, the signal quality is affected greatly by ambient light and the brightness of a host screen, then the received voltage is affected directly by the brightness of the host screen; hence the optical signal received by the dynamic token may be inaccurate, i.e., there may be many errors in the received optical signal.

SUMMARY

It is to provide a method for processing an optical signal and a device thereof in order to solve the problems in the conventional technology.

The invention provides a method for processing an optical signal, including a sampling process and a converting process, where the sampling process comprises steps from S1 to S5, the converting process includes steps from S6 to S8:

S1: sampling, by a sampling module, an electric signal to obtain a sampling result and store the sampling result to a cache;

S2: judging, by the sampling module, whether the number of the sampling results in the cache is greater than a preset value, performing S3 in a case that the number of sampling results in the cache is greater than the preset value; or ending the flow and returning to S1 in a case that the number of sampling results in the cache is not greater than the preset value;

S3: determining, by the sampling module, a current optical signal status of an output apparatus according to the current sampling result;

S4: determining, by the sampling module, received data according to the current optical signal status and a stored optical signal status, and updating the stored optical signal status with the current optical signal status;

S5: sending, by the sampling module, the received data to a converting module;

S6: storing, by the converting module, the received data into a data storage space and judging whether there exists a qualified data head in the data storage space, performing S7 in a case that there exists a qualified data head in the data storage space; or ending the flow and returning to S1 in a case that there does not exist a qualified data head in the data storage space;

S7: recording, by the converting module, a position of the data head;

S8: verifying, by the converting module, whether the data following the data head in the data storage space is legitimate, determining that the received data is correct and ending the flow in a case that the data following the data head is legitimate; or determining that the received data is incorrect and returning to S1 in a case that the data following the data head in the data storage space is not legitimate.

The step before S1 includes: receiving, by an optical sensitive device, an optical signal output by the output apparatus and converting the optical signal to the electric signal, where the sampling module starts to sample the electric signal output by the optical sensitive device in a case that an interrupt trigger signal or a delay trigger signal is received.

The process of sampling electric signal by the sampling module and obtaining a sampling result in S1 includes:
sampling consecutively, by the sampling module, the electric signal for at least 3 times and taking an average of the sampled voltages as the sampling result.

The process of obtaining the sampling result includes:

S11: storing the sampled voltage, by the sampling module, after each time performing the sampling, and comparing the sampled voltage with each of stored voltages, obtaining the sampling result by calculating the average of the sampled voltages in a case that each difference value in the comparing is within a preset range; or discarding the voltage with a large change in a case that the difference values are not all within the preset range and performing S12;

S12: judging whether the number of sampling times is greater than a preset number of times, obtaining the sampling result by calculating the average of the stored voltages in a case that the number of sampling times exceeds the preset number of times; or returning to S11 for continuing the sampling in a case that the number of sampling times does not exceed the preset number of times.

The step between S5 and S6 includes S5': judging, by the converting module, whether data is received, performing S6 in a case that the data is received; or performing S8 in a case that the data is not received.

S3 includes:

S301: judging, by the sampling module, whether the current sampling result is greater than a first preset voltage, recording the current optical signal status as a third status in a case that the current sampling result is greater than the first preset voltage; or performing S302 in a case that the current sampling result is not greater than the first preset voltage;

S302: judging, by the sampling module, whether the current sampling result is smaller than a second preset voltage, recording the current optical signal status as a first status in a case that the current sampling result is smaller than the second preset voltage; or performing S303 in a case that the current sampling result is not smaller than the second preset voltage;

S303: analyzing, by the sampling module, a change trend of voltage according to the current sampling result and other sampling results stored in the cache, recording the current optical signal status as a second status in a case that the change trend is stable; or performing S5' in a case that the change trend is unstable.

The steps between S2 and S3 include:

S21: judging, by the sampling module, whether the sampling result is greater than a maximum preset voltage, updating the maximum preset voltage with the sampling result and performing S23 in a case that the sampling result is greater than the maximum preset voltage; or performing S22 in a case that the sampling result is not greater than the maximum preset voltage;

S22: judging, by the sampling module, whether the sampling result is smaller than a minimum preset voltage, updating the minimum preset voltage with the sampling result and performing S23 in a case that the sampling result is smaller than the minimum preset voltage; or returning to S1 in a case that the sampling result is not smaller than the minimum preset voltage;

S23: calculating, by the sampling module, the first preset voltage and the second preset voltage according to the minimum preset voltage value and the maximum preset voltage value, and returning to S1.

The codes corresponding to the first status, the second status and the third status are 0, 1, 2 respectively;

the process of determining received data according to the current optical signal status and a stored optical status by the sampling module in S4 comprises: adding 3 to the code corresponding to the current optical signal status and subtracting the code corresponding to the stored optical signal status to obtain a difference; performing mod 3 operation on the difference to obtain a remainder and then performing mod 2 operation on the remainder to obtain a result as the received data.

The process of determining received data according to the current optical signal status and a stored optical status by the sampling module in S4 comprises:

determining that the received data is 0 in a case that the process of converting from the stored optical signal status to the current optical status meets a first preset rule; determining that the received data is 1 in a case that the process of converting from the stored optical signal status to the current optical status meets a second preset rule; where the first preset rule is that status changes cynically in an order of the third status, the second status, the first status and the third status; the change order in the second preset rule is opposite to the change order in the first preset rule.

In this case, a first status, a second status and a third status are black, gray and white respectively.

S3 includes:

S311: judging, by the sampling module, whether the current sampling result is greater than the first preset voltage, recording the current optical signal status as a fifth status in a case that the current sampling result is greater than the first preset voltage; or performing S312 in a case that the current sampling result is not greater than the first preset voltage;

S312: judging, by the sampling module, whether the current sampling result is smaller than the second preset voltage, recording the current optical signal status as a first status in a case that the current sampling result is smaller than the second preset voltage; or performing S313 in a case that the current sampling result is not smaller than the second preset voltage;

S313: judging, by the sampling module, whether the current sampling result is greater than a fourth preset value, performing S314 in a case that the current sampling result is greater than the fourth preset value; or performing S315 in a case that the current sampling result is not greater than the fourth preset value;

S314: analyzing, by the sampling module, a change trend of voltage according to the current sampling result and other sampling results stored in the cache, recording the current optical signal status as the second status in a case that the change trend of voltage is stable; or performing S5' in a case that the change trend of voltage is unstable;

S315: judging, by the sampling module, whether the current sampling result is smaller than a third preset voltage, performing S316 in a case that the current sampling result is smaller than a third preset voltage; or performing S317 in a case that the current sampling result is not smaller than a third preset voltage;

S316: analyzing, by the sampling module, the change trend of voltage according to the current sampling result and other sampling results stored in the cache, recording the current optical signal status as a fourth status in a case that the change trend is stable; or performing S5' in a case that the change trend is unstable;

S317: analyzing, by the sampling module the change trend of voltage according to the current sampling result and other sampling results stored in the cache, recording the current optical signal status as a third status in a case that the change trend is stable; or performing S5' in a case that the change trend is unstable;

S3 includes:

S321: judging, by the sampling module, whether the current sampling result is greater than a first preset voltage, recording the current optical signal status as a fifth status in a case that the current sampling result is greater than a first preset voltage; or performing S322 in a case that the current sampling result is not greater than a first preset voltage;

S322: judging, by the sampling module, whether the current sampling result is less than a second preset voltage, recording the current optical signal status as the first status in a case that the current sampling result is less than a second preset voltage; or performing S323 in a case that the current sampling result is not less than a second preset voltage;

S323: analyzing, by the sampling module, the change trend of voltage according to the current sampling result and other sampling results stored in the cache, performing S324 in a case that the change trend is stable; or performing S5' in a case that the change trend is unstable;

S324: judging, by the sampling module, a preset level value range in which the current sampling result falls, recording the current optical signal status as the fourth status in a case that the sampling result is between the second preset voltage and the third preset voltage; recording the current optical signal status as the third status in a case that the sampling result is between the third preset voltage and the fourth preset voltage; recording the current optical signal status as the second status in a case that the sampling result is between the fourth preset voltage and the first preset voltage.

S4 is replaced by the following steps:

S41: judging, by the sampling module, whether the current optical signal status is identical to the stored optical status, continuing the sampling of electric signal and returning to S1 in a case that the current optical signal status is identical to the stored optical status; or performing S42 in a case that the current optical signal status is not identical to the stored optical status;

S42: obtaining, by the sampling module, the received data by calculating according to the code corresponding to the current optical status and the code corresponding to the stored optical signal status and sending the received data to the converting module; updating, by the sampling module, the stored optical signal status with the current optical signal status.

The codes corresponding to the first status, the second status, the third status, the fourth status and the fifth status are 0, 1, 2, 3, 4 respectively;

the process of determining received data by the sampling module according to the current optical signal status and the stored optical signal status includes: adding 4 to the code corresponding to current stored optical signal status and subtracting the code corresponding to the current optical signal status to obtain a difference; performing mod 5 operation on the difference and then performing mod 4 operation on the remainder to obtain the result; determining that the received data is 00 in a case that the result is 0; determining that the received data is 01 in a case that the result is 1; determining that the received data is 10 in a case that the result is 2; determining that the received data is 11 in a case that the result is 3.

The process of determining the received data by the sampling module according to the current optical signal status and the stored optical signal status includes:

detecting an interval between the stored optical signal status and the current optical signal status according to a first preset rule determining that the received data is 00 in a case that the stored optical signal status and the current optical signal status are adjacent; determining that the received data is 01 in a case that the interval is 1; determining that the received data is 10 in a case that the interval is 2; determining that the received data is 11 in a case that the interval is 3;

where the first preset rule is that the status changes cyclically in an order of a fifth status, a fourth status, a third status, a second status, a first status and a fifth status.

The first status, the second status, the third status, the fourth status and the fifth status are respectively black, dark gray, gray, light gray and white.

Between S2 and S3, the method includes:

S21: judging, by the sampling module, whether the sampling result is greater than the maximum preset voltage, updating the maximum preset voltage with the sampling result and performing S23 in a case that the sampling result is greater than the maximum preset voltage; or performing S22 in a case that the sampling result is not greater than the maximum preset voltage;

S22: judging, by the sampling module, whether the sampling result is smaller than the minimum preset voltage, updating the minimum voltage with the sampling result and performing S23 in a case that the sampling result is smaller than the minimum preset voltage; or returning to S1 in a case that the sampling result is not smaller than the minimum preset voltage;

S23: calculating, by the sampling module, to obtain the first preset voltage, the second preset voltage, the third preset voltage and the fourth preset voltage according to the maximum preset voltage and the minimum preset voltage and returning to S1.

S8 includes:

S801: judging, by the converting module, whether the length of the data following the data head in the data storage space meets a preset value, performing S802 in a case that the length of the data following the data head in the data storage space meets a preset value; or ending the flow and returning to S1;

S802: extracting, by the converting module, 8 bits of data following the data head in the data storage space and obtaining a data bit length according to the extracted data;

S803: judging, by the converting module, whether the length of the data after the data bit length in the data storage space is smaller than the data bit length, returning to S1 in a case that the length of the data after the data bit length in the data storage space is smaller than the data bit length; or performing S804 in a case that the length of the data after the data bit length in the data storage space is not smaller than the data bit length;

S804: obtaining, by the converting module, data of corresponding data bit length after the data bit length in the data storage space; dividing the obtained data into groups of 4 bits and converting the groups into decimal number to obtain valid data and check code;

S805: calculating, by the converting module, check code according to the valid data and judging whether the calculated check code is identical to the received check code by comparison, where the data received from the output device is correct in a case that the calculated check code is identical to the received check code; or the data received from the output device is incorrect in a case that the calculated check code obtained is not identical to the received check code and the flow returns to S1 in a case that the calculated check code is not identical to the received check code;

S8 includes:

S812: obtaining, by the converting module, corresponding data following the data head in the data storage space according to the preset data bit length and orderly dividing the obtained corresponding data into groups of 4 bits and converting the groups into decimal number to obtain valid data and check code;

S813: calculating, by the converting module, check code according to the valid data and judging whether the calculated check code is identical to the received check code, where the data received from the output device is correct in a case that the calculated check code is identical to the received check code; or the received data is incorrect in a case that the calculated check code obtained is not identical to the received check code and the flow returns to S1.

An optical signal processing device, comprising a sampling module and a converting module, where the sampling module includes:

a sampling unit, configured to sample an electric signal to obtain a sampling result and store the sampling result into a first storing unit;

the first storing unit, configured to store an optical signal status and the sampling result;

a first judging unit, configured to judge whether the number of the sampling results stored in the first storing unit is greater than a preset value, where in a case that the number of the sampling results stored in the first storing unit is greater than a preset value, a first determining unit starts working; otherwise, the sampling unit continues sampling;

the first determining unit, configured to determine a current optical signal status of an output apparatus according to a current sampling result;

a second determining unit, configured to determine received data according to the current optical signal status and the optical signal status stored in the first storing unit and update the stored optical signal status with the current optical signal status;

a sending unit, configured to send the received data to the converting module; and the converting module includes:

a receiving unit, configured to receive data sent by the sending unit of the sampling module;

a second storing unit, configured to store the data received by the receiving unit a second judging unit, configured to determine whether there exists a qualified data head in the second storing unit, where in a case that there exists a qualified data head in the second storing unit, a recording unit starts working; otherwise, the sampling unit continues sampling;

the recording unit, configured to record a position of the data head;

a verifying unit, configured to verify whether the data following the data head in the second storing unit is legitimate, where in a case that the data following the data head in the second storing unit is legitimate, the received data is correct and operation is ended; otherwise, the received data is incorrect and the sampling unit continues sampling.

The converting module further includes a third judging unit configured to judge whether the receiving unit receives the data sent by the sending unit of the sampling module.

The first determining unit determines the current optical signal status of the output apparatus according to a voltage interval where the sampling result is in and a change trend of the sampling result.

Each optical signal status corresponds to a code; the second determining unit is configured to perform mod operation on the code corresponding to the current optical signal status and the code corresponding to the stored optical signal to determine the received data.

the second determining unit determines the received data according to a rule satisfied in the process of converting from the stored optical signal status to the current optical signal status The verifying unit includes:

an obtaining and converting sub-unit, configured to obtain data of corresponding data bit length from the data following the data head in the second storing unit and divide the obtained data into groups of 4 bits orderly and converts the groups into decimal number to obtain valid data and check code;

a calculating and comparing sub-unit, configured to calculate the check code according to the valid data and judge whether the calculated check code and the received check code are identical, where in a case that the calculated check code and the received check code are identical, the data received by a terminal from the output apparatus is correct; otherwise, the data received by the terminal is incorrect and the sampling module continues sampling;

The verifying unit further includes:

a first judging sub-unit, configured to judge whether the length of the data following the data head in the second storing unit meets a preset value, where in a case that the length of the data following the data head in the second storing unit meets a preset value, an extracting sub-unit works; otherwise, the sampling unit continues sampling;

the extracting sub-unit, configured to extract 8 bits of data following the data head in the second storing unit and obtain the data bit length according to the extracted data;

the second judging sub-unit, configured to judge whether the length of the data after the data bit length in the second storing unit is smaller than the data bit length, where in a case that the length of the data after the data bit length in the second storing unit is smaller than the data bit length, the sampling unit continues sampling, otherwise, the obtaining and converting sub-unit starts working;

the obtaining and converting sub-unit, configured to obtain data of the data bit length after the data bit length in the second storing unit, and divides the obtained data into groups of 4 bits orderly and converts the data into decimal number to obtain valid data and check code.

Compared with the conventional technology, the present invention has following advantages: in the present method, computing average value by sampling for multiple times and adjusting boundary between different optical signals by self-adaptation, hence the interference caused by ambient light and screen brightness to the received optical signal may be reduced, and the sampling process may be more accurate; at the same time, processing received multiple gray level and judging the data header in the data storage space and verifying the legitimacy of the data following the data header, thereby improving the precision and sensitivity of receiving.

DETAILED DESCRIPTION

In order to give further description of the technical solution and effect used by the present invention for expected purpose, by combining the accompany drawings and preferred embodiments, a method for optical signal processing and a device thereof provided by the present invention is described. The specific embodiments and feature and effect of the present invention are described as the following.

Embodiment 1

Embodiment 1 of the invention provides a method for processing an optical signal.

Figure 1:
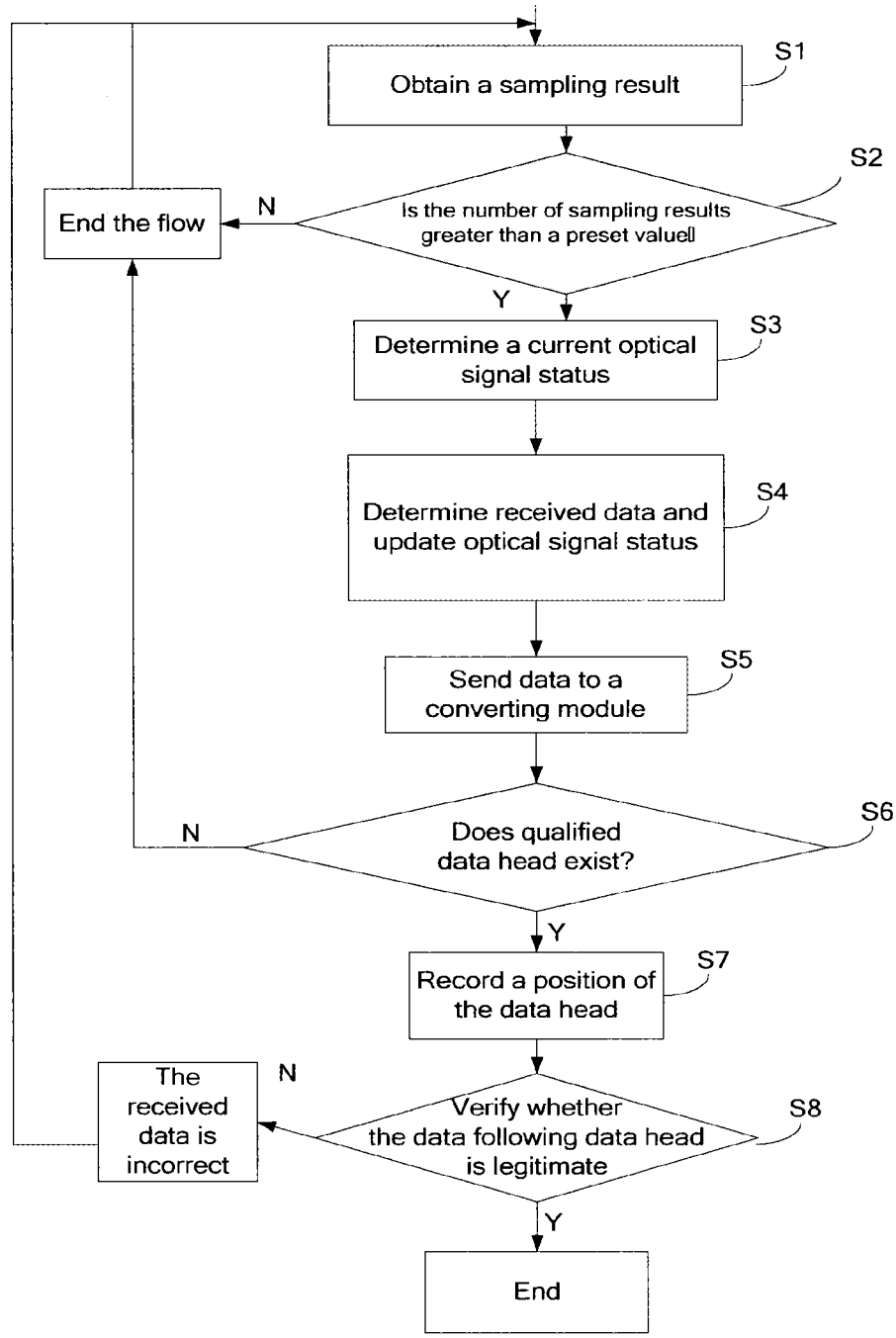
FIG. 1 is a flow chart of a method for processing an optical signal provided according to Embodiment 1 of the invention.

As shown in FIG. 1, the method includes a sampling process and a converting process, where the sampling process is from S1 to S5 and the converting process is from S6 to S8 as follows.

In S1, a sampling module samples an electric signal to obtain a sampling result and stores the sampling result to a cache.

In this embodiment, before S1, an optical sensitive device receives an optical signal output by an output apparatus and converts the received optical signal to the electric signal; in a case that an interrupt trigger signal or a delay trigger signal is received, the sampling module starts to sample the electric signal output by the optical sensitive device.

The process of sampling electric signal to obtain a sampling result by the sampling module includes: the sampling module samples consecutively the electric signal for at least 3 times and takes an average of the sampled voltages as the sampling result. In this embodiment, the process of obtaining sampling result includes S11 to S12.

In S11, after each time performing the sampling by the sampling module, the sampled voltage may be stored and compared with each of stored voltages. The sampling result may be obtained by calculating the average of the sampled voltages in a case that each difference value in the comparing is within a preset range; or the voltage with a large change may be discarded in a case that the difference values are not all within the preset range, and S12 may be performed.

S12 is to judge whether the number of sampling times exceeds a preset number of times. The sampling result may be obtained by calculating the average of the stored voltages in a case that the number of sampling times exceeds the preset number of times; or the process of obtaining sampling result may return to S11 in a case that the number of sampling times does not exceed the preset number of times.

In S2, the sampling module judges whether the number of the sampling results stored in the cache is greater than a preset value. S3 may be performed in a case that the number of the sampling results stored in the cache is greater than a preset value; or the flow may be ended and may return to S1 in a case that the number of sampling results in the cache is not greater than the preset value.

In Embodiment 1, in order to guarantee that the sampling processing result is accurate, at least four sampling results may be set in the cache.

In S3, the sampling module determines a current optical signal status of an output apparatus according to a current sampling result.

In Embodiment 1, the current optical signal status of the output apparatus is determined according to the voltage interval in which the current sampling result falls and the change trend of the current sampling result; for example, the current optical signal is in three statuses (e.g., a first status, a second status and a third status which are represented by black, gray and white respectively). If the sampling result is greater than a first preset voltage, the current optical signal is in the third status; if the sampling result is smaller than a second preset voltage, the current optical signal is in the first status; if the sampling result is between the first and the second preset voltages and the change trend of the sampling result is stable compared with other stored sampling results, the current sampling result is in the second status. In another example, the current optical signal is in five statuses, i.e. (e.g., a first status, a second status, a third status, a fourth status and a fifth status which are represented by black, dark gray, gray, light gray and white). If the sampling result is greater than a first preset voltage, the current optical signal is in the fifth status; if the sampling result is smaller than a second preset voltage, the current optical signal is in the first status; if the change trend of the sampling result is stable compared with other stored sampling results and the sampling result is between the second and the third preset voltages, the current sampling result is in the fourth status; if the sampling result is between the third and the fourth preset voltages, the current sampling result is in the third status; and if the sampling result is between the fourth and the first preset voltages, the current sampling result is in the second status.

In Embodiment 1, the first preset voltage, the second preset voltage, the third preset voltage and the fourth preset voltage may be adjusted in advance, and a maximum voltage (upper limit of white voltage), and a minimum voltage (lower limit of black voltage) may be preset. If the sampling result is greater than the maximum preset voltage, the maximum preset voltage may be updated with the sampling result; if the sampling result is smaller than the minimum preset voltage, the minimum preset value may be updated with the sampling result, and then the interval between the maximum preset voltage and the minimum preset voltage may be divided into three equal parts to adjust the first preset voltage (the boundary between white and gray) and the second preset voltage (the boundary between gray and black), or the interval between the maximum preset voltage and the minimum preset voltage may be divided into five equal parts to adjust the first preset voltage (the boundary between white and light gray), the second preset voltage (the boundary between light gray and gray), the third preset voltage (the boundary between gray and dark gray) and the fourth preset voltage (the boundary between dark gray and black).

In S4, the sampling module determines the received data according to the current optical signal status and a stored optical signal status and updates the stored optical signal status with the current optical signal status.

In Embodiment 1, the status of each optical signal may be configured to be corresponding to a code, and the received data is determined by dividing the code corresponding to current optical signal status and the code corresponding to the stored optical signal status and obtaining a remainder; if the optical signal is in three statuses, and the codes corresponding to a first status, a second status and a third status are 0, 1 and 2 respectively. The received data is obtained as follows: add 3 to the code corresponding to the current optical signal status and subtract the code corresponding to the stored optical signal status to obtain a difference; perform mod 3 operation on the difference to obtain a remainder; and perform mod 2 operation on the remainder to obtain a result as the received data. If the optical signal is in five statuses, the codes corresponding to a first status, a second status, a third status, a fourth status and a fifth status are corresponding to 0, 1, 2, 3 and 4 respectively, the received data is obtained as follows: add 4 to the code corresponding to current stored optical signal status and subtract the code corresponding to the current optical signal status to obtain a difference; perform mod 5 operation on the difference to obtain a remainder; and perform mod 4 operation on the remainder to obtain a result. If the result is 0, the received data is 00; if the result is 1, the received data is 01; if the result is 2, the received data is 10; if the result is 3, the received data is 11.

In Embodiment 1, the receive data may be determined by the rule satisfied in the process of converting from the stored optical signal status to the current optical signal status; for example, the optical signal is in three statuses, if a first preset rule is satisfied, the received data is 0; if a second preset rule is satisfied, the received data is 1; the first preset rule is that status changes cyclically in an order of the third status, the second status, the first status and the third status; the change order of the second preset rule is opposite to the change order of the first preset rule. If there are 5 optical signal statuses, the interval between the stored optical signal status and the current optical signal status may be checked according to the first preset rule, i.e. the status changes cyclically in an order of the fifth status, the fourth status, the third status, the second status, the first status and the fifth status; if the stored optical signal status and the current optical signal status are adjacent, the received data is 00; if the interval is 1, the received data is 01; if the interval is 2, the received data is 10; if the interval is 3, the received data is 11.

In a case that the output apparatus outputs a single-color optical signal, the received data may be determined as follows: judge whether the current optical signal status is identical to the stored optical signal status; the electric signal may be sampled and the sampling process may return to S1 in a case that the current optical signal status is identical to the stored optical signal status; or the received data may be obtained by calculating the code corresponding to the current optical signal status and the code corresponding to the stored optical status in a case that the current optical signal status is not identical to the stored optical signal status, where the calculating method may refer to the foregoing method and detailed description thereof is omitted herein.

In S5, the sampling module sends the received data to a converting module.

In Embodiment 1, the step between S5 and S6 includes: judging, by the converting module, whether the data is received; S6 may be performed in a case that the data is received; or S8 may be performed in a case that the data is not received.

In S6, the converting module stores the received data into a data storage space and judges whether there exists a qualified data head in the data storage space; S7 may be performed in a case that there exists a qualified data head in the data storage space; or the flow may be ended and may return to S1 in a case that there does not exist a qualified data head in the data storage space.

In S7, the converting module records a position of the data head.

In S8, the converting module verifies whether the data following the data head in the data storage space is legitimate; it may be determined that the received data is correct and the flow may be ended in a case that the data following the data head in the data storage space is legitimate; or it may be determined that the received data is incorrect and the flow may return to S1 in a case that the data following the data head in the data storage space is not legitimate.

In Embodiment 1, the process of verifying whether the data following the data head in the data storage space is legitimate includes judging whether a length of the data following the data head is qualified and verifying a check code; obtaining a data bit length by obtaining data of a preset length following the data head, or presetting the data bit length and obtaining the corresponding data according to the data bit length and converting the corresponding data to decimal data to obtain the valid data and check code; calculating the check code according to the valid data and judging whether the calculated check code is identical to the calculated check code; the data is legitimated and the flow is ended in a case that the calculated check code is identical to the calculated check code; or the data is illegitimate, and the flow may return to S1 in a case that the calculated check code is not identical to the calculated check code.

In a case that the data sent by the output apparatus includes a function code, the data of a preset length includes function code and data bit length.

Embodiment 2

Embodiment 2 of the invention provides a method for processing an optical signal.

Figure 2:
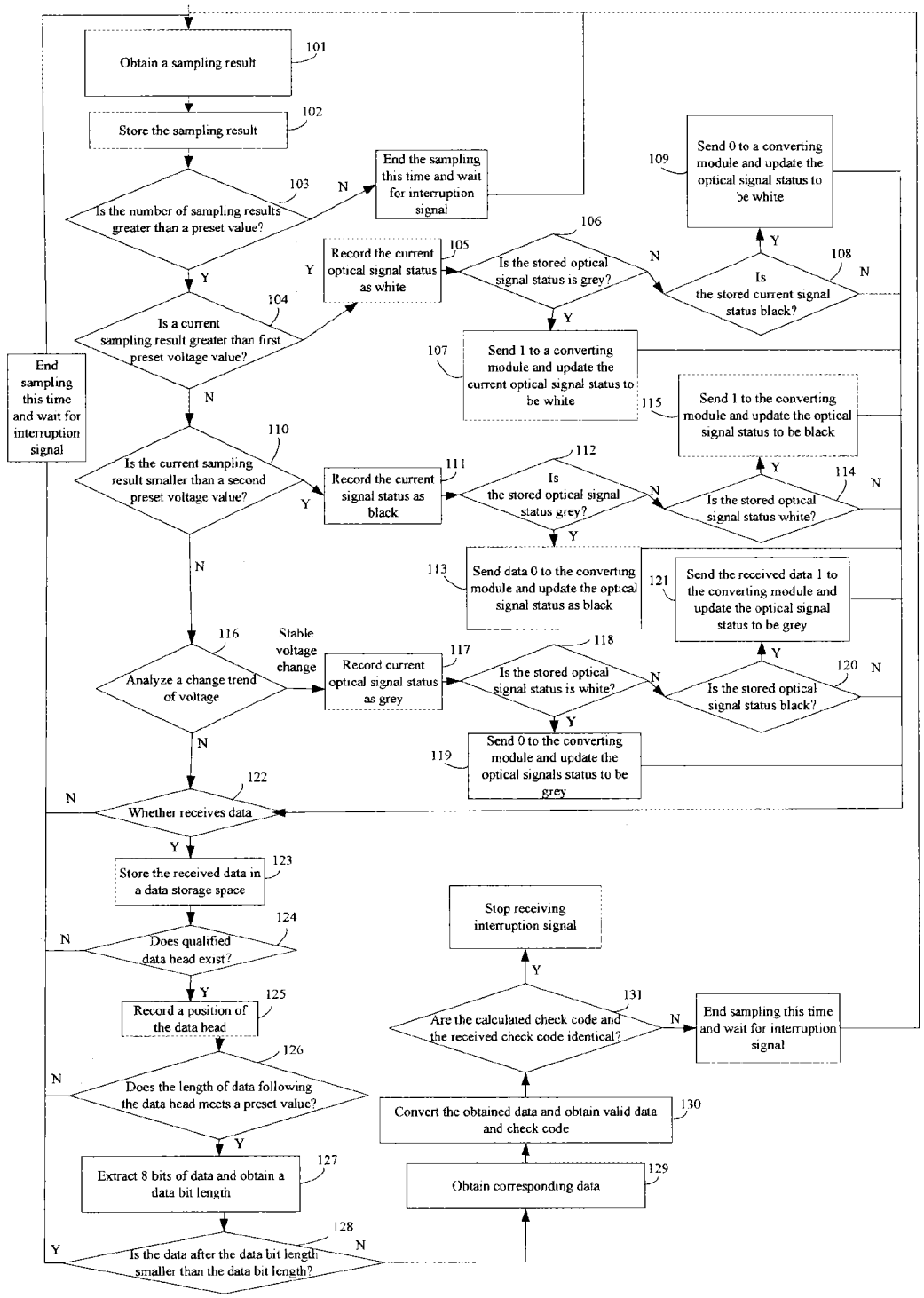
FIG. 2 is a flow chart of a method for processing an optical signal provided according to Embodiment 2 of the invention.

In Embodiment 2, three optical signal statuses, i.e., black, gray and white, are taken as examples for detailed description. The three statuses of black, gray and white are corresponding to a high level, a middle level and a low level respectively. After a terminal received an optical signal output by an output apparatus, the optical signal may be converted to an electric signal by an optoelectronic device, and the electric signal may be sampled by a processing apparatus, where the processing apparatus includes a sampling module for sampling process and a converting module for converting process. In this embodiment, the processing method includes a sampling process and a converting process; as shown in FIG. 2, the sampling process includes the steps from Step 101 to Step 121, and the converting process includes the steps from Step 122 to Step 132.

In Step 101, in a case that an interrupt signal is received, the sampling module starts receiving electric signal and acquire consecutively multiple voltages and then obtains a sampling result.

In Embodiment 2, in a case that the apparatus receives the interrupt signal, the sampling module may acquire the voltages consecutively for 4 or 8 times and obtain a sampling result by calculating the average of the sampled voltages.

In Embodiment 2, the process of obtaining the sampling result includes the Step 101-1 to Step 101-2 as follows.

In Step 101-1, after each time performing the sampling, the sampled voltage may be stored and compared with each of the stored voltages sampled previously; the sampling result may be obtained by calculating the average of the sampled voltages in a case that the differences are all within a preset range; or the voltage with a large change may be discarded and then Step 101-2 may be performed in a case that the differences are not all within the preset range.

In Embodiment 2, in a case that the change amplitude of the sampled voltage is large, the sampled voltage with a large change may be discarded in a way that the sampling result may not be incorrect due to the voltage interference.

Step 101-2 is to judge whether the number of sampling times is greater than a preset number of times; in a case that the number of sampling times exceeds the preset number of times, the sampling result may be obtained by calculating the rest of the stored voltages; or the sampling may be continued and the flow may return to Step 101-1 in a case that the number of sampling times does not exceed the preset number of times.

In Embodiment 2, a timer generates an interrupt signal at every fixed time interval and an interrupt signal trigger processing apparatus starts working; preferably, the fixed time interval in Embodiment 1 is 8 ms.

In Embodiment 2, a sampling rate is greater than a sending rate of a sending device; generally, the sampling rate is twice the sending rate at least, where the higher sampling rate is, the better restoring effect of the optical signal may be. The sampling module of the processing apparatus may be guaranteed to sample the electric signal corresponding to a same optical signal output by a terminal apparatus for multiple times, thereby improving the sampling accuracy; preferably, the sampling rate in this embodiment is 128 Hz (i.e., the output rate of the output apparatus is from 16 Hz to 22 Hz).

Before Step 101, the steps further includes: after the terminal is activated, the timer thereof may be reset and start counting time; in a case that the counted time reaches a preset value, an interrupt signal may be generated, and the timer trigger processing apparatus may start working, and Step 101 may be performed and the timer may be reset to count time again; in this embodiment, the timer may be implemented by software or hardware; preferably, in this embodiment, the terminal of the Embodiment may be a dynamic token.

Step 102 is to store the sampling result into a cache.

Step 103 is to judge whether the number of the sampling results in the cache is greater than a preset value; in a case that the number of the sampling results in the cache is greater than a preset value, Step 104 may be performed; or the sampling of this time may be ended and an interrupt signal may be waited in a case that the number of the sampling results in the cache is not greater than the preset value.

The preset value is 4 in this embodiment.

Step 104 is to judge whether the current sampling result is greater than a first preset voltage; in a case that the current sampling result is greater than a first preset voltage, Step 105 may be performed; or Step 110 may be performed in a case that the current sampling result is not greater than the first preset voltage;

The first preset voltage in this embodiment is the boundary between the white and the gray optical signal status.

Step 105 is to record the current optical signal status as white.

Step 106 is to judge whether the stored optical signal status is gray; in a case that the stored optical signal status is gray, Step 107 may be performed; or Step 108 may be performed in a case that the stored optical signal status is not gray.

In Step 107, the received data is 1 and the data may be sent to the converting module, and the stored optical signal status may be updated from gray to white, and Step 122 may be performed.

Step 108 is to judge whether the stored optical signal status is black; in a case that the stored optical signal status is black, Step 109 may be performed; or Step 122 may be performed in a case that the stored optical signal status is not black.

In Step 109, the received data is 0 and the data may be sent to the converting module, and the stored optical signal status may be updated from black to white, and then Step 122 may be performed.

Step 110 is to judge whether the current sampling result is smaller than a second preset voltage; in a case that the current sampling result is smaller than a second preset voltage, Step 111 may be performed; or Step 116 may be performed in a case that the current sampling result is not smaller than the second preset voltage.

The second preset voltage in this embodiment is the boundary between the gray and the black optical signal status.

Step 111 is to record the current optical signal status as black.

Step 112 is to judge whether the stored optical signal status is gray, in a case that the stored optical signal status is gray, Step 113 may be performed; or Step 114 may be performed in a case that the stored optical signal status is not gray.

In Step 113, the received data is 0 and the data may be sent to the converting module, and the stored optical signal status may be updated from gray to black, and then Step 122 may be performed.

Step 114 is to judge whether the stored optical signal status is white; in a case that the stored optical signal status is white, Step 115 may be performed; or Step 122 may be performed in a case that the stored optical signal status is not white.

In Step 115, the received data is 1 and the data may be sent to the converting module, and the stored optical signal status may be updated from white to black, and Step 122 may be performed.

Step 116 is to analyze a change trend of voltage according to the current sampling result and the previous two sampling results; in a case that the voltage change is stable, Step 117 may be performed; or Step 122 may be performed in a case that the voltage change is unstable.

In Embodiment 2, Step 116 includes judging whether the absolute values of the differences between the current sampling result and the previous two sampling results are both in a preset range; if the absolute values of the differences between the current sampling result and the previous two sampling results are both in a preset range, the voltage change is stable; otherwise, the voltage change is unstable; if the current sampling result is a3, the previous two sampling results are a1 and a2, judging whether |a3−a1| and |a3−a2| are both less than 0.5, if |a3−a1| and |a3−a2| are both less than 0.5, the voltage change is stable; otherwise, the voltage change is unstable.

Step 117 is to record the current optical signal status as gray.

Step 118 is to judge whether the stored optical signal status is white; in a case that the stored optical signal status is white, Step 119 may be performed; or Step 120 may be performed in a case that the stored optical signal status is not white.

In Step 119, the received data is 0 and the data may be sent to the converting module, and the stored optical signal status may be updated from white to gray, and then Step 122 may be performed.

Step 120 is to judge whether the stored optical signal status is black. In a case that the stored optical signal status is black, Step 121 may be performed; or Step 122 may be performed in a case that the stored optical signal status is not black.

In Step 121, the received data is 1 and the data may be sent to the converting module, and the stored optical signal status may be updated from black to gray, and Step 122 may be performed.

In Step 122, the converting module judges whether data is received; in a case that the converting module receives data, Step 123 may be performed; or the sampling of this time may be ended and an interrupt signal may be waited in a case that the converting module does not receive data.

In Step 123, the received data may be stored into a data storage space.

Step 124 is to judge whether there is a qualified data head in the data space; in a case that there is a qualified data head in the data space, Step 125 may be performed, and the sampling of this time may be ended, and then an interrupt signal may be waited.

In Embodiment 2, the data head is preset, in this embodiment, the data head is 111110, which is applicable to the processing process of any number of optical signal statuses, such as three optical signal statuses, five optical signal statuses and nine optical signal statuses. Step 124 specifically is to judge whether there is 111110 in data storage space; if there is 111110 in the data storage space, it is determined that there is a qualified data head in the data storage space; otherwise, it is determined that there is not qualified data header is in data storage space and the stored data is incorrect.

In Embodiment 2, there may be other ways to implement Step 124 for example, in a case that the storage space is relatively small or there are many data stored in the storage space, this step is to judge whether the data in the data storage space is 111110; in a case that the data in the data storage space is 111110, Step 125 may be performed; or a first bit of data in the data storage space may be discarded, and the operation may be ended, and an interrupt signal may be waited to be received in a case that the data in the data storage space is not 111110.

Step 125 is to record a position of data head.

In Embodiment 2, an offset between a most significant bit of the data head and a start position thereof may be recorded.

Step 126 is to judge whether the length of the data following the data head in the data storage space meets a preset value. In a case that the length of the data following the data head in the data storage space meets a preset value, Step 127 may be performed; or the flow may be ended and an interrupt signal may be waited in a case that the length of the data following the data head in the data storage space does not meet the preset value.

In Embodiment 2, the preset value is 8.

Step 127 is to extract 8 bits of data following the data head in the data storage space and obtain the length of the data bit required to be received according to the extracted data.

In Embodiment 2, if the received binary data includes a function code, the preset value in Step 126 is a sum of length of data bit and length of function code.

Correspondingly, Step 127 is modified to be extracting function code and length of data bit following the data head in the data storage space.

Step 128 is to judge whether the length of the data after the length of data bit in data storage space is smaller than the length of data bit. In a case that the length of the data following the length of data bit in data storage space is smaller than the length of data bit, the sampling of this time may be ended and an interrupt signal may be waited; or Step 129 may be performed in a case that the length of the data following the length of data bit in data storage space is not smaller than the length of data bit.

In Embodiment 2, the length of data bit may be preset, then Step 129' may be performed after Step 125: obtaining the corresponding data following the data head in the data storage space according to preset data bit length, and then Step 130 may be performed.

Step 129 is to obtain the corresponding data after the length of data bit in the data storage space according to the length of the data bit.

Step 130 is to divide the obtained data into groups of 4 bits in order and converting the data into decimal data to obtain valid data and check code.

Step 131 is to calculate check code according to the valid data and judging whether the calculated check code and the received check code are identical. In a case that the calculated check code and the received check code are identical, the data received by the terminal from the output apparatus is correct and the receiving of interrupt signal may be stopped; or the data received by the terminal is incorrect, and then the sampling of this time may be ended, and an interrupt signal may be waited in a case that the calculated check code and the received check code are not identical.

In Embodiment 2, if the data received by the terminal from the output apparatus is correct, the converted decimal data may be sent to other modules for the subsequent operation, such as calculating a dynamic password according to the sent decimal data and outputting the dynamic password; if the received data is incorrect, operation this time may be ended and an interrupt signal may be waited to be received, if the interrupt signal is received, the step 101 may be returned and the electric signal converted by optical sensitive device may be sampled again.

In Embodiment 2, the steps 105 to 121 may be replaced by the following steps s1 to s10.

The step s1 is to judge whether the current sampling result is more than a first preset voltage, if the current sampling result is more than a first preset voltage, the step s2 may be performed; otherwise, the step s3 may be performed.

In Embodiment 2, the first preset voltage is the boundary between the white and the gray optical signal status.

The step s2 is to record the current optical signal status as white and step s7 may be performed.

The step s3 is to judge whether the current sampling result is less than a second preset voltage, if the current sampling result is less than a second preset voltage, the step s4 may be performed; otherwise, the step s5 may be performed.

In Embodiment 2, the second preset voltage is the boundary between the gray and the black optical signal status.

The step s4 is to record the current optical signal status as black, and the step s7 may be performed.

In the step s5, according to the current sampling result and the previous two sampling results, the change trend of voltage may be analyzed. In a case that the voltage change is stable, the step s6 may be performed; or the step 126 may be performed in a case that the voltage change is unstable.

In Embodiment 2, the step s5 is to judge whether the absolute values of the differences between the current sampling result and the previous two sampling results are both in a preset range. In a case that the absolute values of differences between the current sampling result and the previous two sampling results are both in a preset range, the voltage trend is stable; or the voltage trend is unstable in a case that the absolute values of differences between the current sampling result and the previous two sampling results are not both in a preset range; in a case that the current sampling result is a3, and the previous two sampling results are a1 and a2, the process is to judge whether |a3−a1| and |a3−a2| are both less than 0.5; in a case that |a3−a1| and |a3−a2| are both less than 0.5, the voltage change is stable; or the voltage change is unstable in a case that |a3−a1| and |a3−a2| are not both less than 0.5.

The step s6 is to record the current optical signal status as gray and perform the step s7.

The step s7 is to judge whether the process of the stored optical signal status changing to recorded current optical signal status accords with a preset rule. In a case that the process of the stored optical signal status changing to recorded current optical signal status accords with a preset rule, the step s8 may be performed; or the step s9 may be performed in a case that the process of the stored optical signal status changing to recorded current optical signal status does not accord with the preset rule.

In this embodiment, the preset rule is a circle of "white→gray→black→white".

In the step s8, the received data is 0 and the data is sent to a converting module, and the step s10 may be performed.

In the step s9, the received data is 1 and the data is sent to the converting module, and the step s10 may be performed in sequence.

In the step s10 is to update the stored current optical signal status with the recorded current optical signal status, and the step 122 may be performed.

Before the method of this embodiment, the optical sensitive device converts the black, the white and the gray optical statuses output by the terminal into corresponding voltage signals. In this method, the voltage signal may be processed, and the output binary value may be judged by detecting the voltage change output by optical sensitive device; finally, the binary value may be converted into decimal data to generate dynamic password, thereby improving the accuracy and sensitivity of the receiving.

The technical solution of this embodiment may further be implemented in the manner of time delay. The step 101 may be replaced by the step 101'.

In the step 101', the sampling module receives electric signal and samples multiple voltages consecutively, and the mean of the voltages may be taken as a sampling result.

In the step before the step 101', the processing device begins to work after a preset time length after the terminal is activated, and then the step 101' may be performed.

If the amount of the sampling results in the cache does not exceed a preset value in the step 103, the sampling of this time may be ended and the time delay may be waited.

If the length of the data after the length of the data bit in the data storage space is not less than the length of the data bit in Step 128 or Step 132, the operation may be ended and the step 101' is performed after a preset time length.

In the implementation of time delay, a timer is counting time all the time; when the preset time is arrived, ending current operation. In the time delay period, the processing device may perform other operation and may not affect implementing of the invention.

Embodiment 3

Figure 3:
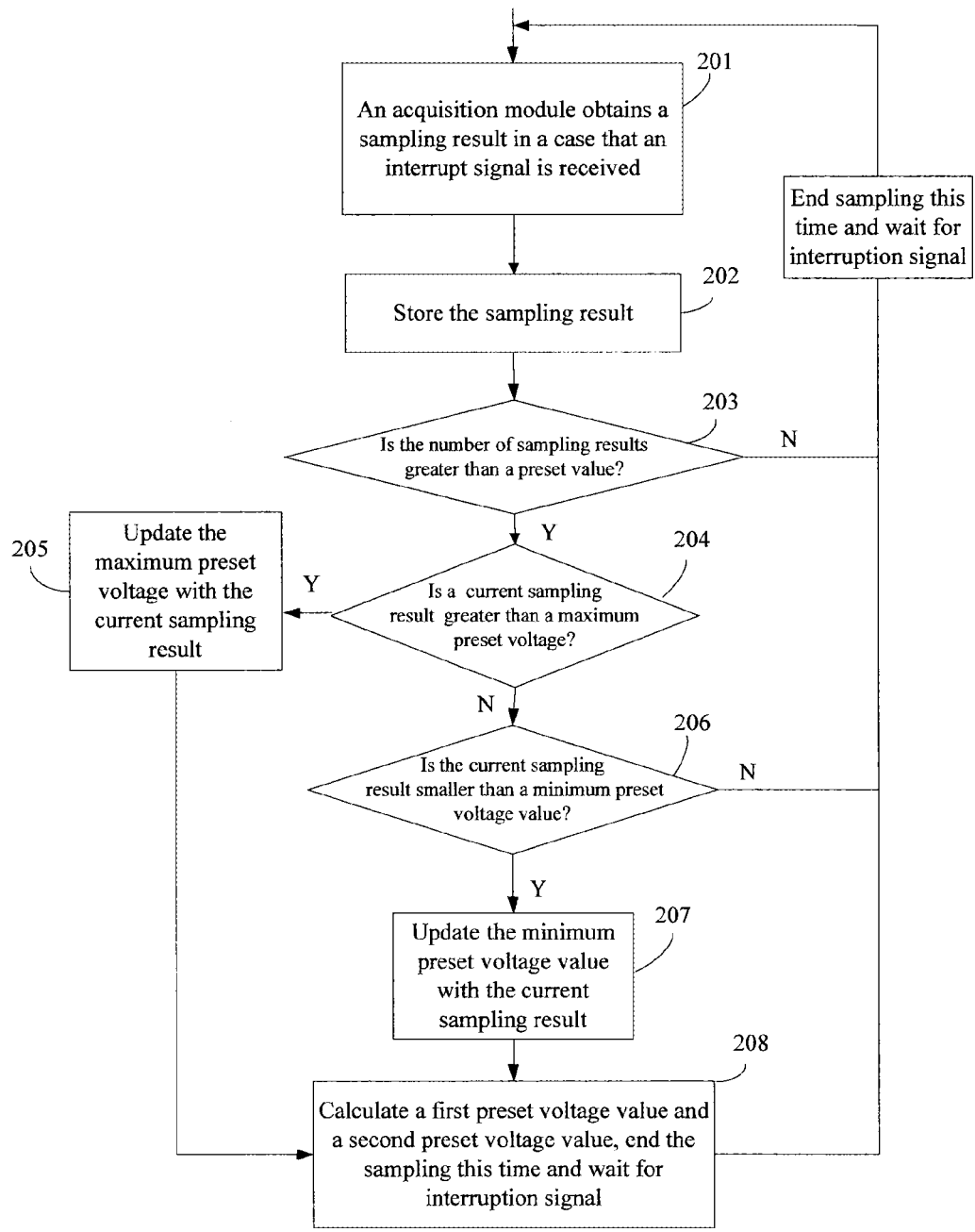
FIG. 3 is a flow chart of a method for adjusting a preset voltage in an adaptive manner provided according to Embodiment 3 of the invention.

Embodiment 3 of the invention provides a method for adjusting a preset voltage by self-adaptation. In this embodiment, a maximum preset voltage and a minimum preset voltage are required to be adjusted by self-adaptation before sampling. The maximum preset voltage is the maximum voltage in a case that the optical signal status is white; the minimum preset voltage is the minimum voltage in a case that the optical signal status is black; as shown in FIG. 3, the method of this embodiment includes the Step 201 to Step 208 as follows.

In Step 201, in a case that an interrupt signal is received, an acquisition module receives an electric signal and consecutively acquires multiple voltages and then obtains a sampling result.

In Embodiment 3, in a case that a device receives the interrupt signal, the device acquires consecutively for 4 or 8 times and calculates the average of the sampled voltages to obtain the sampling result.

In Embodiment 3, a timer generates an interrupt signal at every fixed time interval, where the interrupt signal is adapted to trigger the acquisition module to start working; preferably, the fixed time interval in Embodiment 3 is 8 ms.

Before Step 201, the steps further include: after activating a terminal, the timer of the terminal is reset and starts counting time; in a case that the counted time reaches a preset value, an interrupt signal is generated; the timer triggers a processing device to start working, and then Step 201 may be performed; after the timer is reset, the timer starts counting time again.

In Step 202, the sampling result is stored into a cache.

Step 203 is to judge whether the number of sampling results in the cache is greater than a preset value. In a case that the number of sampling results in the cache is greater than a preset value, Step 204 may be performed; or the sampling of this time may be ended and an interrupt signal may be waited in a case that the number of sampling results in the cache is not greater than the preset value.

The preset number in Embodiment 3 is 4.

Step 204 is to judge whether a current sampling result is greater than the maximum preset voltage. In a case that the current sampling result is greater than the maximum preset voltage, Step 205 may be performed; or Step 206 may be performed in a case that the current sampling result is not greater than the maximum preset voltage.

Step 205 is to update the maximum preset voltage with the current sampling result and perform Step 208.

Step 206 is to judge whether the current sampling result is smaller than the minimum preset voltage. In a case that the current sampling result is smaller than the minimum preset voltage, Step 207 may be performed; or the sampling of this time may be ended and an interrupt signal may be waited in a case that the current sampling result is not smaller than the minimum preset voltage.

Step 207 is to update the minimum preset voltage with the current sampling result and perform Step 208.

Step 208 is to calculate a first preset voltage and a second preset voltage according to the minimum preset voltage and the maximum preset voltage, and to end the sampling of this time and wait for an interrupt signal.

Step 208 in Embodiment 3 is to take the ⅔ of the difference between the maximum preset voltage and the minimum preset voltage as the first preset voltage, and take ⅓ of the difference between the maximum preset voltage and the minimum preset voltage as the second preset voltage.

In Embodiment 3, the first preset voltage is a boundary between the voltages corresponded respectively to a white and a gray optical signal status, and the second preset voltage is a boundary between the voltages corresponded respectively to a gray and a black optical signal status.

In a case that there are multiple optical signal statuses, for example, five optical signal status which includes white, light gray, dark gray and black, Step 208 may be replaced by Step 208'.

Step 208' is to calculate a first preset voltage, a second preset voltage, a third preset voltage and a fourth preset voltage according to the maximum preset voltage and the minimum preset voltage, and to end the sampling of this time and wait for an interrupt signal.

The first preset voltage is a boundary between the voltages corresponding to a white and a light gray optical signal status, the fourth preset voltage is a boundary between the voltages corresponding to a light gray and a gray optical signal status, the third preset voltage is a boundary between the voltages corresponding to a gray and a dark gray optical signal status, and the second preset voltage is a boundary between the voltages corresponding to a dark gray and a black optical signal status.

In Embodiment 3, Step 208' specifically includes taking ⅘ of difference between the maximum preset voltage and the minimum preset voltage as the first preset voltage; taking ⅗ of difference of the maximum preset voltage and the minimum preset voltage as the fourth preset voltage; taking ⅖ of difference of the maximum preset voltage and the minimum preset voltage as the third preset voltage and taking ⅕ of difference of the maximum preset voltage and the minimum preset voltage as the second preset voltage.

In a case that the method is implemented by time delay, Step 201 of Embodiment 1 is replaced by Step 201'; the process may return to Step 201' after a preset duration from Step 205 and Step 207 of Embodiment 1; implementation of other steps is as same as this embodiment, and detailed descriptions is omitted herein.

In Step 201', the sampling module receives electric signal, consecutively acquires multiple voltages and obtains a sampling result.

In Embodiment 3, self-adaptation process is performed for three times so as to adjust the first preset voltage, the second preset voltage (the third preset voltage and the fourth preset voltage); then the electric signal output by the optical sensitive device is acquired and processed, which improves precision of data process. For example, if a system voltage is 2.5V, an initial first preset voltage is 2 and a second preset voltage is 1, in a case that an acquiring result is more than 2 or less than 1, the first preset voltage and/or the second preset voltage may be updated with the acquiring result and the self-adaptation process may be performed.

Embodiment 4

Figure 4:
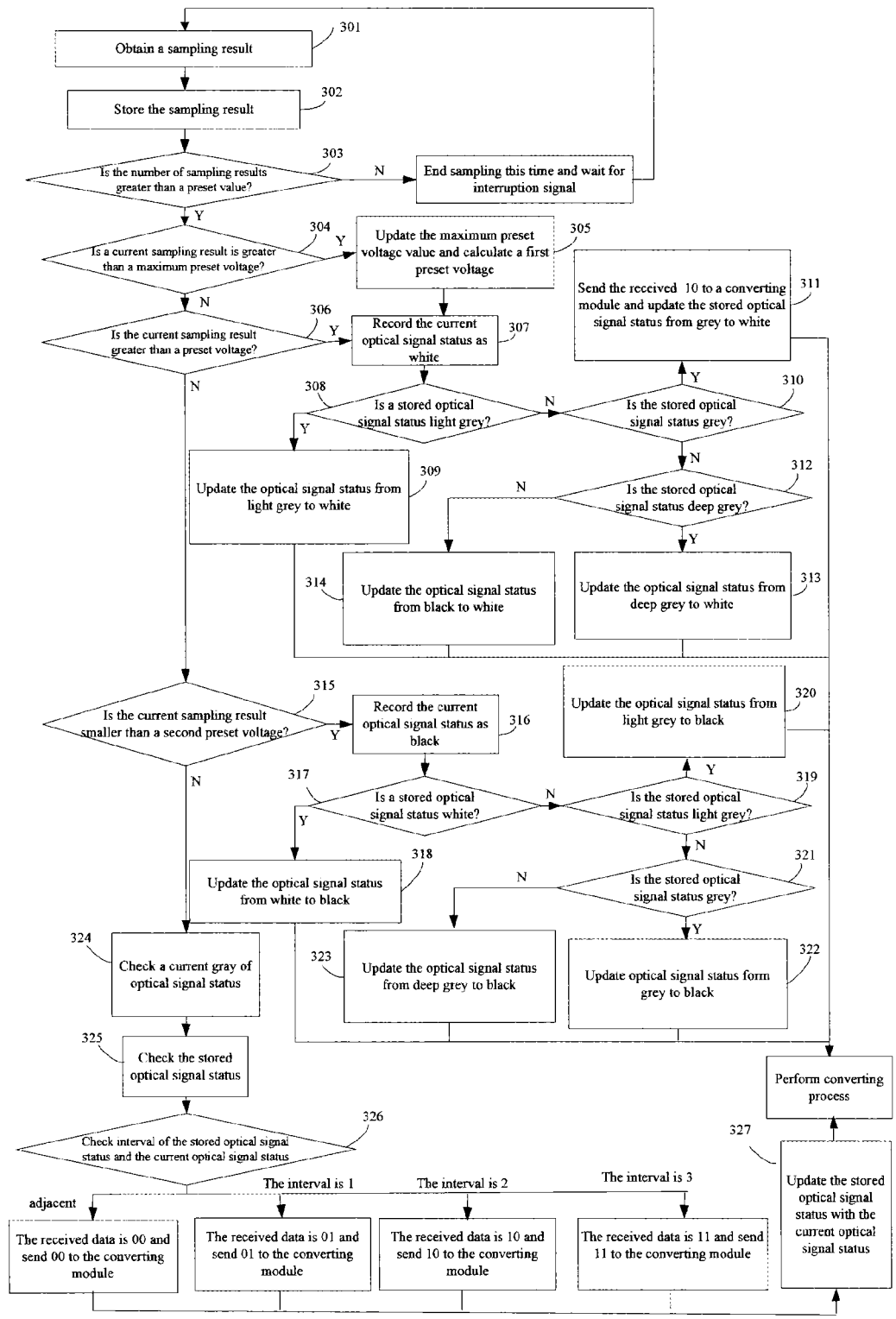
FIG. 4 is a flow chart for another method for processing an optical signal provided according to Embodiment 4 of the invention.

Embodiment 4 provides another method for processing an optical signal. For example, the optical signal status is black, light gray, gray, dark gray and black. The method includes a sampling process and a converting process. The converting process is the same as that of Embodiment 2 and no more detail is given here. The sampling process is shown in FIG. 4, which includes Step 301 to Step 327 as follows.

In Step 301, in a case that an interrupt signal is received, a sampling module starts receiving electric signal, acquires multiple voltages consecutively and obtains a sampling result.

Specifically, in Embodiment 4, in a case that a device receives the interrupt signal, the device acquires voltage for 4 or 8 times and calculates the average of the sampled voltages to obtain the sampling result.

In Embodiment 4, a timer generates an interrupt signal at every fixed time interval, where the interrupt signal is adapted to trigger the sampling module to start working. In Embodiment 4, the fixed time interval is 8 ms.

The method further includes that, before Step 301, after starting an terminal, the timer on the terminal is reset and starts counting time; in a case that the counted time reaches a preset value, an interrupt signal is generated and the timer triggers a processing device to start working, and then Step 301 may be performed; the timer restarts counting time after being reset.

In Step 302, the sampling result is stored into a cache.

Step 303 is to judge whether the number of sampling results in the cache is greater than a preset value. In a case that the number of sampling results in the cache is greater than the preset value, Step 304 may be performed; or the sampling of this time may be ended and an interrupt signal may be waited in a case that the number of sampling results in the cache is not greater than the preset value.

The preset number in Embodiment 4 is 4.

Step 304 is to judge whether a current sampling result is greater than a maximum preset voltage. In a case that the current sampling result is greater than the maximum preset voltage, Step 305 may be performed; or Step 306 may be performed in a case that the current sampling result is not greater than the maximum preset voltage.

In Embodiment 4, an initial maximum preset voltage is 2.5.

Step 305 is to update the maximum preset voltage with the current sampling result and calculate a first preset voltage, and then Step 307 may be performed.

In Embodiment 4, the difference between the value of sample voltage and a preset fixed voltage is taken as the first preset voltage.

Step 306 is to judge whether the current sample result is greater than the first preset voltage. In a case that the current sample result is greater than the first preset voltage, Step 307 may be performed; or Step 315 may be performed in a case that the current sample result is not greater than the first preset voltage.

In Embodiment 4, the first preset voltage is a boundary between a white optical signal status and a light gray optical signal status; an initial first preset voltage is 2.

Step 307 is to record a current optical signal status as white.

Step 308 is to judge whether a stored optical signal status is light gray. In a case that the stored optical signal status is light gray, Step 309 may be performed; or Step 310 may be performed in a case that the stored optical signal status is not light gray.

In Step 309, the received data is 11 and the data may be sent to a converting module; the stored optical signal status may be updated from light gray to white, and the converting process may be performed.

Step 310 is to judge whether the stored optical signal status is gray. In a case that the stored optical signal status is gray, Step 311 may be performed; or Step 312 may be performed in a case that the stored optical signal status is not gray.

In Step 311, the received data is 10 and the data may be sent to the converting module; the stored optical signal status may be updated from gray to white, and the converting process may be performed.

Step 312 is to judge whether the stored optical signal status is dark gray. In a case that the stored optical signal status is dark gray, Step 313 may be performed; or Step 314 may be performed in a case that the stored optical signal status is not dark gray.

In Step 313, the received data is 01 and the data may be sent to the converting module; the stored optical signal status may be updated from dark gray to white, and the converting process may be performed.

In Step 314, the received data is 00 and the data may be sent to the converting module; stored optical signal status may be updated from black to white, and the converting process may continue.

Step 315 is to judge whether the current sampling result is smaller than a second preset voltage. In a case that the current sampling result is smaller than a second preset voltage, Step 316 may be performed; or Step 324 may be performed in a case that the current sampling result is not smaller than a second preset voltage.

In Embodiment 4, a low level value is a boundary between a black optical signal status and a dark gray optical signal status; an initial second preset voltage is 0.5.

Step 316 is to record the current optical signal status as black.

Step 317 is to judge whether the stored optical signal status is white. In a case that the stored optical signal status is white, Step 318 may be performed; or Step 319 may be performed in a case that the stored optical signal status is not white.

In Step 318, the received data is 11 and the data may be sent to the converting module; the stored optical signal status may be updated from white to black, and the converting process may be performed.

Step 319 is to judge whether the stored optical signal status is light gray. In a case that the stored optical signal status is light gray, Step 320 may be performed; or Step 321 may be performed in a case that the stored optical signal status is not light gray.

In Step 320, the received data is 10 and the data may be to the converting module; the stored optical signal status may be updated from light gray to black, and the converting process may be performed.

Step 321 is to judge whether the stored optical signal status is gray. In a case that the stored optical signal status is gray, Step 322 may be performed; or Step 323 may be performed in a case that the stored optical signal status is not gray.

In Step 322, the received data is 01 and the data may be sent to the converting module; the stored optical signal status may be updated from gray to black, and the converting process may be performed.

In Step 323, the received data is 00 and the data may be sent to the converting module; the stored optical signal status may be updated from dark gray to black, and the converting process may be performed.

Step 324 is to detect a current gray of optical signal status.

In Embodiment 4, Step 324 includes Step 324-1 to Step 324-2 as follows.

Step 324-1 is to analyze a change trend of voltage according to the current sampling result and the previous two sampling results; in a case that the voltage change is stable, Step 324-2 may be performed; or the converting process may be performed in a case that the voltage change is unstable.

Step 324-2 is to judge a range of the preset voltage in which the current sampling result falls; if the current sampling result is between the second preset voltage and a third preset voltage, the current optical signal status may be recorded as dark gray; if the current sampling result is between the third preset voltage and a fourth preset value, the current optical signal status may be recorded as gray; if the current sampling result is between the fourth preset voltage and the first preset voltage, the current optical signal status may be recorded as light gray.

In Embodiment 4, the second preset voltage, the third preset voltage and the fourth preset voltage and the second preset voltage are 0.5,1,1.5,2 respectively.

Step 325 is to check the stored optical signal status.

Step 326 is to check interval of the stored optical signal status and the current optical signal status according to a preset rule. If the stored optical signal status and the current optical signal status are adjacent, the received data is 00 and the data may be sent to the converting module, Step 327 may be performed; if the interval is 1, the received data is 01 and the data may be sent to the converting module, Step 327 may be performed; if the interval is 2, the received data is 10 and the data may be sent to the converting module, Step 327 may be performed; if the interval is 3, the received data is 11 and the data may be sent to the converting module, Step 327 may be performed.

In Embodiment 4, the preset rule is a cyclic changing process in a following order: white, light gray, gray, dark gray, black, white. For example, the stored optical signal status is white, if the current optical signal status is light gray, the stored optical signal status and the current optical signal status are adjacent; if the current optical signal status is gray, the interval is 1; if the current optical signal status is dark gray, the interval is 2; if the current signal status is black, the interval is 3.

Step 327 is to update the stored optical signal status with the current optical signal status, and the converting process may continue.

In Embodiment 4, the self-adaptation process illustrated in Embodiment 3 may be performed before Step 301.

Figure 5:
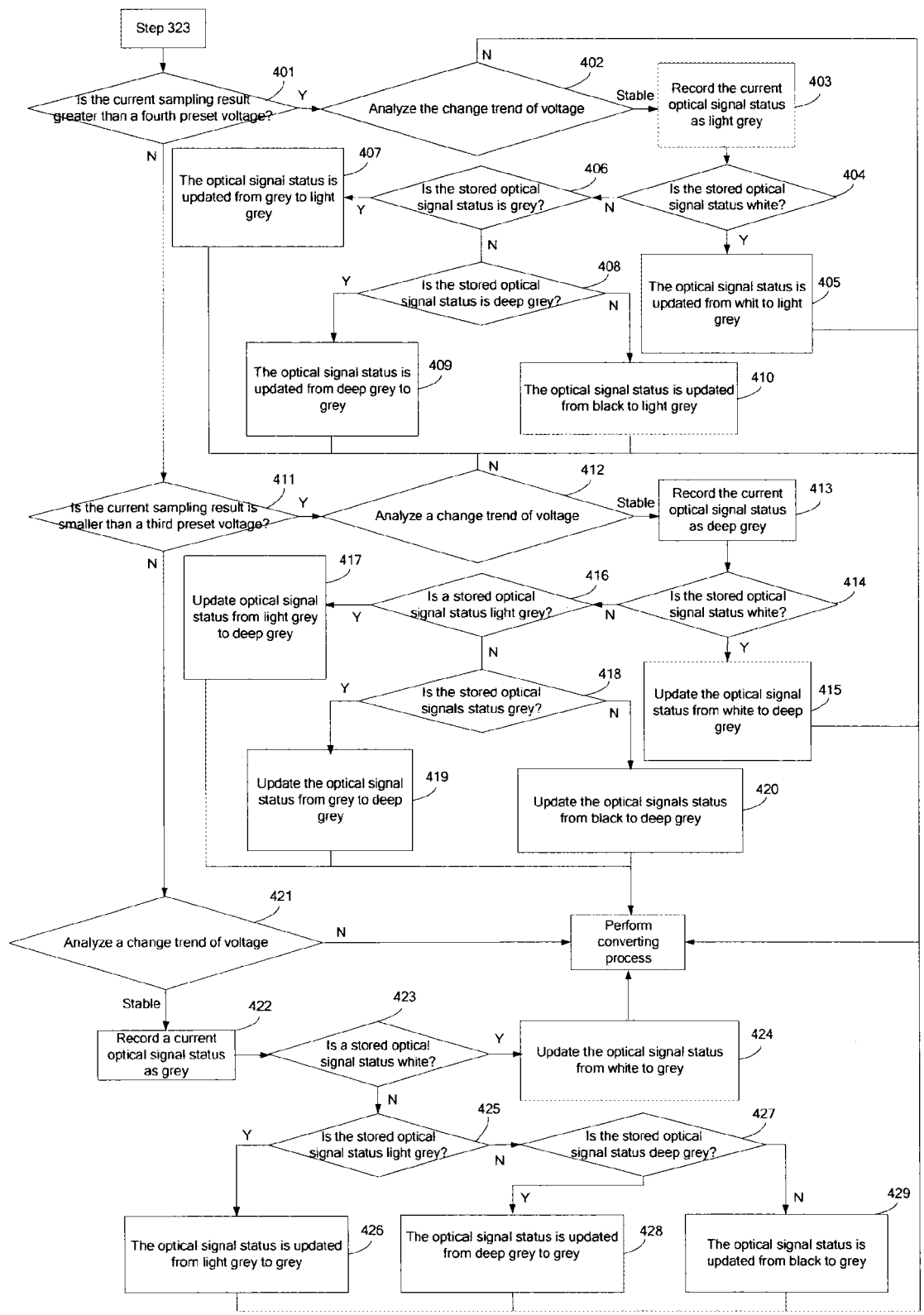
FIG. 5 is a flow chart of another implementation process of step 326 to 329 in FIG. 4.

Step 324 to Step 327 in Embodiment 4 may be replaced by another implementing way. For example, as shown in FIG. 5, the implementing way includes Step 401 to Step 429 as follows.

Step 401 is to judge whether a current sampling result is greater than the fourth preset voltage. In a case that the current sampling result is greater than the fourth preset voltage, Step 402 may be performed; or Step 411 may be performed in a case that the current sampling result is not greater than the fourth preset voltage.

In Embodiment 4, the fourth preset voltage is a boundary between a light gray optical signal status and a gray optical signal status; the fourth preset voltage is 1.5.

Step 402 is to analyze the change trend of voltage according to the current sampling result and the previous two sampling results; in a case that change trend of voltage is stable, Step 403 may be performed; or the converting process may be performed in a case that change trend of voltage is unstable.

In Embodiment 4, the processing device judges whether the absolute values of the differences between the current sampling result and the previous two sampling results are both in a preset range. In a case that the absolute values of the differences between the current sampling result and the previous two sampling results are both in a preset range, the change trend of voltage is stable; or the change trend of voltage is unstable in a case that the absolute values of the differences between the current sampling result and the previous two sampling results are not both in a preset range. If the current sampling result is a3, the previous two sampling results are a1 and a2, the method is to judge whether both |a3−a1| and |a3−a2| are less than 0.1. In a case that both |a3−a1| and |a3−a2| are less than 0.1, the change trend of voltage is stable; or the change trend of voltage is unstable in a case that |a3−a1| and |a3−a2| are not both less than 0.1.

Step 403 is to record the current optical signal status as light gray;

Step 404 is to judge whether the stored optical signal status is white. In a case that the stored optical signal status is white, Step 405 may be performed; or Step 406 may be performed in a case that the stored optical signal status is not white.

In Step 405, the received data is 00; the stored optical signal status may be updated from white to light gray, and the converting process may be performed.

Step 406 is to judge whether the stored optical signal status is gray. In a case that the stored optical signal status is gray, Step 407 may be performed; or Step 408 may be performed in a case that the stored optical signal status is not gray.

In Step 407, the received data is 11; the stored optical signal status may be updated from gray to light gray, and the converting process may be performed.

Step 408 is to judge whether the stored optical signal status is dark gray. In a case that the stored optical signal status is dark gray, Step 409 may be performed; or Step 410 may be performed in a case that the stored optical signal status is not dark gray.

In Step 409, the received data is 10; the stored optical signal status may be updated from dark gray to gray, and the converting process may be performed.

In Step 410, the received data is 01, the stored optical signal status may be updated from black light gray, and the converting process may be performed.

Step 411 is to judge whether the current sampling result is smaller than the third preset voltage. In a case that the current sampling result is smaller than the third preset voltage, Step 412 may be performed; or Step 421 may be performed in a case that the current sampling result is not smaller than the third preset voltage.

The third preset voltage in Embodiment 4 is a boundary between the voltages corresponding to the gray and dark gray optical signal status; the third preset voltage in Embodiment 4 is 1.

Step 412 is to analyze the change trend of voltage according to the current sampling result and the previous two sampling results. In a case that the change trend of voltage is stable, Step 413 may be performed; or the converting process may be performed in a case that the change trend of voltage is unstable.

In Embodiment 4, the device judges whether the absolute values of the differences between the current sampling result and the previous two sampling results are both in a preset range. In a case that the absolute values of the differences between the current sampling result and the previous two sampling results are both in a preset range, the change trend of voltage is stable; or the change trend of voltage is unstable in a case that the absolute values of the differences between the current sampling result and the previous two sampling results are not both in a preset range. If the current sampling result is a3, the previous two sampling result are a1 and a2, the method is to judge whether both |a3−a1| and |a3−a2| are less than 0.1. In a case that both |a3−a1| and |a3−a2| are less than 0.1, the change trend of voltage is stable; or the change trend of voltage is unstable in a case that both |a3−a1| and |a3−a2| are not less than 0.1.

Step 413 is to record the current optical signal status as dark gray;

Step 414 is to judge whether the stored optical signal status is white. In a case that the stored optical signal status is white, Step 415 may be performed; or Step 416 may be performed in a case that the stored optical signal status is not white.

In Step 415, the received data is 10, the stored optical signal status may be updated from white to dark gray, and the converting process may be performed.

Step 416 is to judge whether the stored optical signal status is light gray. In a case that the stored optical signal status is light gray, Step 417 may be performed; or Step 418 may be performed in a case that the stored optical signal status is not light gray.

In Step 417, the received data is 01, the stored optical signal status may be updated from light gray to dark gray, and the converting process may be performed.

Step 418 is to judge whether the stored optical signal status is gray. In a case that the stored optical signal status is gray, Step 419 may be performed; or Step 420 may be performed in a case that the stored optical signal status is not gray.

In Step 419, the received data is 00, the stored optical signal status may be updated from gray to dark gray, and the converting process may be performed.

In Step 420, the received data is 11, the stored optical signal status may be updated from black to dark gray, and the converting process may be performed.

Step 421 is to analyze the change trend of voltage according to the current sampling result and the previous two sampling result; in a case that the voltage change is stable, Step 422 may be performed; or the converting process may be performed in a case that the voltage change is unstable.

In Embodiment 4, the processing device judges whether the absolute values of the differences between the current sampling result and the previous two sampling results are both in a preset range. In a case that the absolute values of the differences between the current sampling result and the previous two sampling results are both in a preset range, the change trend of voltage is stable; or the change trend of voltage is unstable in a case that the absolute values of the differences between the current sampling result and the previous two sampling results are not both in the preset range. If the current sampling result is a3, the previous two sampling result are a1 and a2, the method is to judge whether both |a3−a1| and |a3−a2| are less than 0.1. In a case that both |a3−a1| and |a3−a2| are less than 0.1, the change trend of voltage is stable; or the change trend of voltage is unstable in a case that |a3−a1| and |a3−a2| are not both less than 0.1.

Step 422 is to record current optical signal status as gray.

Step 423 is to judge whether the stored optical signal status is white. In a case that the stored optical signal status is white, Step 424 may be performed. Otherwise, Step 425 may be performed in a case that the stored optical signal status is not white.

In Step 424, the received data is 01, the stored optical signal status may be updated from white to gray, and the converting process may be performed.

Step 425 is to judge whether the stored optical signal status is light gray. In a case that the stored optical signal status is light gray, Step 426 may be performed; or Step 427 may be performed in a case that the stored optical signal status is not light gray.

In Step 426, the received data is 00; the stored optical signal status may be updated from light gray to gray, and the converting process may be performed.

Step 427 is to judge whether the stored optical signal status is dark gray. In a case that the stored optical signal status is dark gray. Step 428 may be performed; or Step 429 may be performed in a case that the stored optical signal status is not dark gray.

In Step 428, the received data is 11, the stored optical signal status may be updated from dark gray to gray, and the converting process may be performed.

In Step 429, the received data is 10, the stored optical signal status may be updated from black to gray, and the converting process may be performed.

Embodiment 5

Figure 6:
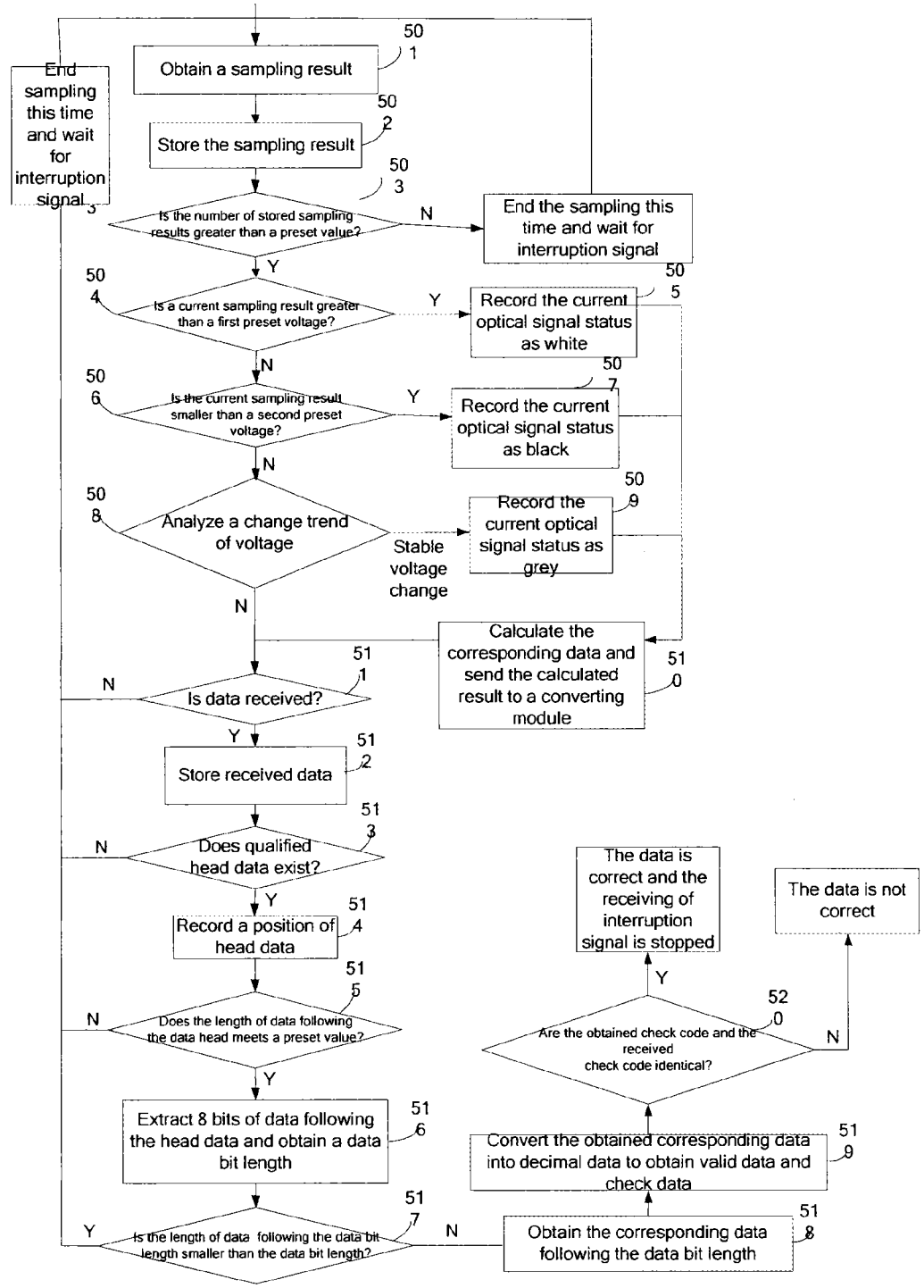
FIG. 6 is a flow chart of another method for processing an optical signal provided according to Embodiment 5 of the invention.

Embodiment 5 of the invention provides another method for processing an optical signal, which uses different numbers to represent different colors. For example, 2 represents white; 1 represents gray; 0 represents black. The processing process is performed after self-adaptation. The self-adaptation may be implemented according to Embodiment 3. As shown in FIG. 6, the process method of Embodiment 5 includes Step 501 to Step 520.

In Step 501, in a case that an interrupt signal is received, a sampling module starts receiving electric signal, acquires multiple voltages consecutively and obtains a sampling result.

The implement0ing process of Step 501 in Embodiment 5 may refer to Step 101 in Embodiment 2; no more detail is given herein.

Step 502 is to store the sampling result into a cache.

Step 503 is to judge whether the number of sampling results in the cache is greater than a preset value. In a case that the number of sampling results in the cache is greater than a preset value, Step 504 may be performed; or the sampling of this time may be ended and an interrupt signal may be waited in a case that the number of sampling results in the cache is not greater than the preset value.

The preset number in Embodiment 5 is 4.

Step 504 is to judge whether a current sampling result is greater than a first preset value. In a case that the current sampling result is greater than a first preset value, Step 505 may be performed; or Step 506 may be performed in a case that the current sampling result is not greater than the first preset value.

The first preset voltage in Embodiment 5 is a boundary between a white optical signal status and a gray optical signal status.

Step 505 is to record the current optical signal status as white and perform Step 510.

Step 506 is to judge whether the current sampling result is smaller than a second preset voltage. In a case that the current sampling result is smaller than a second preset voltage, Step 507 may be performed; otherwise, Step 508 may be performed in a case that the current sampling result is not smaller than the second preset voltage.

The second preset voltage in Embodiment 5 is a boundary between a gray optical signal status and a black optical signal status.

Step 507 is to record the current optical signal status as black and perform Step 510.

Step 508 is to analyze a change trend of voltage according to the current sampling result and the previous two sampling results; in a case that the voltage change is stable, Step 509 may be performed; or Step 511 may be performed in a case that the voltage change is unstable.

In Embodiment 5, a device judges whether the absolute values of respective differences between the current sampling result and the previous two sampling results are both in a preset range. In a case that the absolute values of respective differences between the current sampling result and the previous two sampling results are both in a preset range, the change trend of voltage is stable; or the change trend of voltage is unstable in a case that the absolute values of respective differences between the current sampling result and the previous two sampling results are not both in a preset range; if the current sampling result is a3, the previous two sampling results are a1 and a2, the method is to judge whether both |a3−a1| and |a3−a2| are less than 0.5. In a case that both |a3−a1| and |a3−a2| are less than 0.5, the change trend of voltage is stable; or the change trend of voltage is unstable in a case that |a3−a1| and |a3−a2| are not both less than 0.5.

Step 509 is to record the current optical signal status as gray and perform Step 510.

Step 510 is to calculate according to the data corresponding to the recorded current optical signal status and the data corresponding to the stored optical signal status and send a calculating result to a converting module; update the stored optical signal status with the current optical signal status and perform Step 511.

In Embodiment 5, the process of calculating according to the data corresponding to the current optical signal status and the data corresponding to the stored optical signal status includes: add 3 to the data corresponding to the current optical signal status and subtract the data corresponding to the stored optical signal to obtain a different; perform mod 3 operation on the difference to obtain a remainder; and perform mod 2 operation on the remainder to obtain a result as the received data. If the current optical signal status is black, and the stored optical signal status is gray, the result is 0, which represents that the received data is 0. In a case that an output apparatus outputs a single-color optical signal, Step 510 in Embodiment 5 may be replaced by steps from Step 510'-1 to Step 510'-2.

In Step 510'-1, the sampling module judges whether the current output optical signal status is identical to the stored optical signal status. In a case that the current output optical signal status is identical to the stored optical signal status, an interrupt signal may be waited, and the process may return to Step 501; or Step 510'-2 may be performed in a case that the current output optical signal status is not identical to the stored optical signal status.

In Embodiment 5, if the current output optical signal status is identical to the stored optical signal status, it represents that no new data is acquired.

Step 510'-2 is to calculate according to a number corresponding to the current optical signal status and a number corresponding to the stored optical signal status to obtain received data and sends the received data to the converting module, and update the stored optical signal status with the current optical signal status.

In Step 511, the converting module judges whether data is received or not. In a case that the converting module receives data, Step 512 may be performed; or the sampling of this time may be ended and an interrupt signal may be waited in a case that the converting module does not receive data.

Step 512 is to store the received data into a data storage space.

Step 513 is to judge whether there is a qualified data head in the data storage space. In a case that there is a qualified data head in the data storage space, Step 514 may be performed; or the sampling of this time may be ended and an interrupt signal may be waited in a case that there is not qualified data head in the data storage space.

The format of data head in Embodiment 5 may be preset, which may refer to the implementation of Embodiment 2.

Step 514 is to record a position of data head and perform Step 515.

In Embodiment 5, an offset between a most significant bit of the data head and a start position thereof may be recorded.

Step 515 is to judge whether the length of the data following the data head in data storage space meets a preset value. In a case that the length of the data following the data head in data storage space meets a preset value, Step 516 may be performed; or the sampling of this time may be ended and an interrupt signal may be waited in a case that the length of the data following the data head in data storage space does not meet the preset value.

Step 516 is to extract 8 bits of data following the data head in the data storage space and obtain data bit length according to the extracted data.

The received data in Embodiment 5 does not include function code.

Step 517 is to judge whether the length of the data after the data bit length in the data storage space is smaller than the data bit length. In a case that the length of the data after the data bit length in the data storage space is smaller than the data bit length, the sampling of this time may be ended and an interrupt signal may be waited; or Step 518 may be performed in a case that the length of the data after the data bit length in the data storage space is not smaller than the data bit length.

Step 518 is to obtain the corresponding data after the data bit length in the data storage space according to the data bit length.

Step 519 is to divide the obtained data into groups of 4 bits in order and convert the data into decimal data to obtain valid data and check code.

Step 520 is to calculate the check code according to the valid data and judging whether the calculated check code and sent check code are identical. In a case that the calculated check code and sent check code are identical, it represents that data received by a terminal from a terminal is correct and the receiving of interrupt signal may be stopped; or it represents that the data received by the terminal is incorrect in a case that the calculated check code and sent check code are not identical.

In embodiment 5, there may be multiple optical signal statuses exist. For example, in a case that five statuses are white, light gray, gray, dark gray and black respectively, and the corresponded data are 4, 3, 2, 1, 0 respectively; in a case that there are five statuses, 2 bit data is transmitted each time. The way to determine the current optical signal status may refer to the methods described in Embodiment 3 and Embodiment 4. The process of calculating according to the data corresponding to the recorded current optical signal status and the data corresponding to stored optical signal status in Step 510 includes:

Add 4 to the data corresponding to the current optical signal status and subtract the data corresponding to the stored optical signal status and obtain a difference; perform mod 5 operation on the difference to obtain a remainder; and perform mod 4 operation on the remainder to obtain a result. If the result is 0, the corresponding received data is 00; if the result is 1, the received data is 01; if the result is 2, the corresponding received data is 10; if the result is 3, the received data is 11. For example, if the current optical signal status is black (the corresponded code is 0); if the stored optical signal status is gray, the corresponding code is 2, if the computing result is 2. it represents that the received data is 10.

In Embodiment 5, in a case that an interrupt signal is received in the process of waiting, the process may return to Step 501 and start acquiring voltage.

In Embodiment 5, the process is to calculate according to the number corresponding to the currently recorded optical signal status and the data corresponding to the stored last optical signal status to obtain the received binary number and send the binary number to a converting device to perform converting process, thereby simplifying the processing and improving processing rate.

Emobodiment 6

Figure 7:
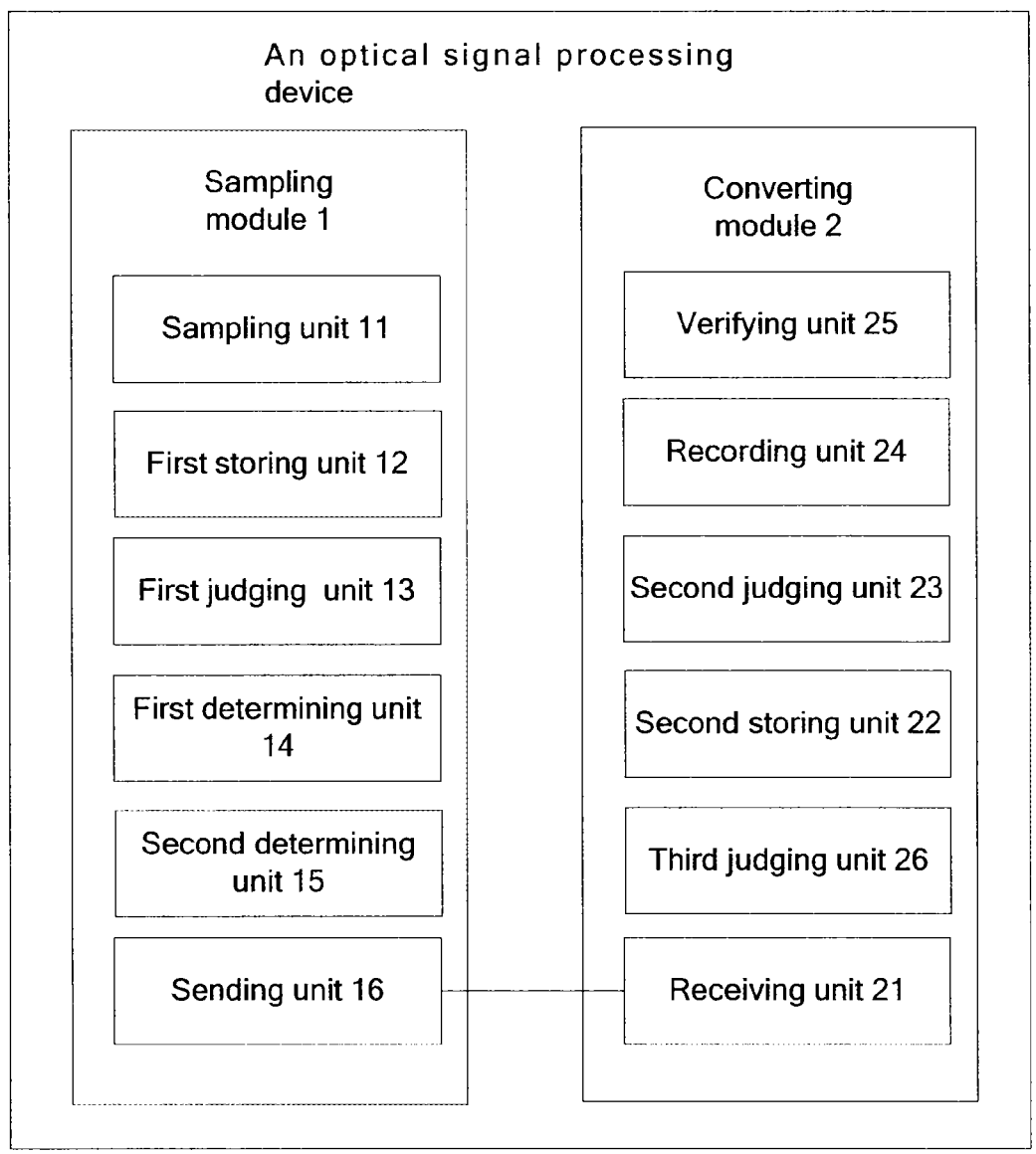
FIG. 7 is a block diagram of an optical signal processing device provided according to Embodiment 6 of the invention.

Embodiment 6 provides an optical signal processing device. In a case that an interrupt trigger signal or a delay trigger signal is received, the device starts working and sampling electric signal output by an optical sensitive device. The optical sensitive device is adapted to receive optical signal output by an output apparatus and convert the signal into electric signal. As shown in FIG. 7, the optical signal processing device in Embodiment 6 includes a sampling module 1 and a converting module 2. The sampling module 1 includes:

a sampling unit 11, configured to sample the electric signal to obtain a sampling result and stores the sampling result into a first storing unit 12;

the sampling unit in Embodiment 6 consecutively samples the electric signal for at least 3 times consecutively, and calculates an average of the sampled voltages and takes the mean as a sampling result. In Embodiment 6, the process of obtaining the sampling result includes the steps as follows.

In s11, after each time performing the sampling by the sampling unit 11, the sampling unit stores the sampled voltage and compares the sampled voltage with each of stored voltages. In a case that the difference values are all within a preset range, the sampling result may be obtained by calculating the average of the sampled voltages; or the voltage with a large change may be discarded, and s12 may be performed in a case that the difference values are not all within a preset range.

In s12, the sampling unit 11 judges whether the number of sampling times is greater than a preset number of times. In a case that the number of sampling times exceeds a preset number of times, the sampling result may be obtained by calculating the mean of stored voltages; or the sampling may continue and the flow may return to s11 in a case that the number of sampling times does not exceed a preset number of times.

a first storing unit 12, configured to store sampling result and optical signal status;

a first judging unit 13, configured to judge whether the number of the sampling results stored in the first storing unit 12 is greater than a preset value; in a case that the number of the sampling results stored in the first storing unit 12 is greater than the preset value, a first determining unit 14 may start working; or the sampling unit 11 may continue sampling in a case that the number of the sampling results stored in the first storing unit 12 is not greater than the preset value;

the first determining unit 14, configured to determine a current optical signal status of the output apparatus according to a current sampling result;

In Embodiment 6, the first determining unit 14 determines the current optical signal status of the output apparatus according to a voltage interval in which the current sampling result falls and a change trend;

a second determining unit 15, configured to determine received data according to the current optical signal status and the optical signal status stored in the first storing unit 12 and update the stored optical signal status with the current optical signal status;

In Embodiment 6, each optical signal status corresponds to a code; the second determining unit 15 performs mod operation on the code corresponding to the current optical signal status and the code corresponding to the stored optical signal status to determine the received data; or the second determining unit 15 determines the received data according to a rule satisfied in the process of converting from the stored optical signal status to the current optical signal status;

a sending unit 16, configured to send the received data to the converting module 2;

the converting module 2 includes:

a receiving unit 21, configured to receive the data sent by the sending unit 16 of the sampling module 1;

a second storing unit 22, configured to store the data received by the receiving unit 21;

a second judging unit 23, configured to judge whether there exists a qualified data header in the second storing unit 22; in a case that there exists a qualified data header in the second storing unit 22, a recording unit 24 may work; or the sampling unit 11 may continue sampling in a case that there does not exist qualified data header in the second storing unit 22;

the recording unit 24, configured to record a position of data head;

a verifying unit 25, configured to verify whether the data following the data head in the second storing unit 22 is legitimate; in a case that the data following the data head in the second storing unit 22 is legitimate, the received data is correct and the process is ended; or the received data is incorrect and the sampling unit 11 may continue sampling in a case that the data following the data head in the second storing unit 22 is not legitimate;

The verifying unit 25 in Embodiment 6 includes:

an obtaining and converting sub-unit, configured to obtain data of a data bit length from the data following the data head in the second storing unit and divide the obtained data into groups of 4 bits orderly and convert the data of groups into decimal number to obtain valid data and check code;

a calculating and comparing sub-unit, configured to calculate the check code according to the valid data and judge whether the calculated check code and the received check code are identical; in a case that the calculated check code and the received check code are identical, it indicates that the data received by an terminal from the output apparatus is correct; or it indicates that the data received by the terminal is incorrect and the sampling unit 11 may continue sampling in a case that the calculated check code and the received check code are not identical;

the verifying unit 25 further includes:

a first judging sub-unit, configured to judge whether the length of the data following the data head in the second storing unit meets a preset value; in a case that the length of the data following the data head in the second storing unit meets a preset value, an extracting sub-unit works; or the flow may be ended and the sampling unit 11 may continue sampling in a case that the length of the data following the data head in the second storing unit does not meet the preset value;

the extracting sub-unit, configured to extract 8 bits of data following the data head in the second storing unit and obtain data bit length according to the obtained data;

a second judging sub-unit, configured to judge whether the length of the data after the data bit length in the second storing unit is smaller than the data bit length; in a case that the length of the data after the data bit length in the second storing unit is smaller than the data bit length, the sampling unit 11 may continue sampling; or the flow may be ended and the obtaining and converting sub-unit works in a case that the length of the data after the data bit length in the second storing unit is not smaller than the data bit length.

Correspondingly, the obtaining and converting sub-unit is adapted to obtain data of a data bit length after the data bit length in the second storing unit 22 and divide the obtained data into groups of 4 bits orderly and converts the data of groups into decimal number to obtain valid data and check code.

The converting module 2 in Embodiment 6 further includes a third judging unit 26 adapted to judge whether the receiving unit 21 receives data sent by the sending unit 16 of the sampling module 1.

In Embodiment 6, the sampling unit obtains sampling value by sampling for multiple times, hence the interference caused by ambient light and screen brightness to the received optical signal may be reduced, and the sampling process may be more accurate; at the same time, the second determining unit processes the received the gray of multiple levels; the second judging unit judges the data head in the data storage space and verifies the legitimacy of the data following the data head, thereby improving the precision and sensitivity of receiving.

The terminal in Embodiment 6 includes a host and a processing device and an optical sensitive device hardware, etc., which are installed in the host.

The above description is only the preferable implementation of the invention, and the protection scope thereof is not restricted herein. The variation or replacement within the technical scope made by those skilled in the art may fall into the protection scope of the invention. Therefore, the protection scope of the invention may be subject to the protection scope of the claims.

The invention claimed is:

1. A method for processing an optical signal, comprising a sampling process and a converting process, wherein the sampling process comprises steps from S1 to S5, and the converting process comprise steps from S6 to S8, and steps S1 to S8 comprising:

S1: sampling, by a sampling module, an electric signal to obtain a sampling result and store the sampling result to a cache;

S2: judging, by the sampling module, whether the number of sampling results in the cache is greater than a preset value, performing S3 in a case that the number of sampling results in the cache is greater than the preset value; or ending a flow and returning to S1 in a case that the number of sampling results in the cache is not greater than the preset value;

S3: determining, by the sampling module, a current optical signal status of an output apparatus according to a current sampling result;

S4: determining, by the sampling module, received data according to the current optical signal status and a stored optical signal status and updating the stored optical signal status with the current optical signal status;

S5: sending, by the sampling module, the received data to a converting module;

S6: storing, by the converting module, the received data into a data storage space and judging whether there exists a qualified data head in the data storage space, performing S7 in a case that there exists the qualified data head in the data storage space; or ending the flow and returning to S1 in a case that there does not exist the qualified data head in the data storage space;

S7: recording, by the converting module, a position of the qualified data head; and S8: verifying, by the converting module, whether data following the qualified data head in the data storage space is legitimate, determining that the received data is correct and ending the flow in a case that the data following the qualified data head is legitimate; or determining that the received data is incorrect and returning to S1 in a case that the data following the data head in the data storage space is not legitimate.

2. The method according to claim 1, wherein before S1, the method further comprises: receiving, by an optical sensitive device, an optical signal output by the output apparatus and converting the optical signal to the electric signal, wherein the sampling module starts to sample an electric signal output by the optical sensitive device in a case that an interrupt trigger signal or a delay trigger signal is received.

3. The method according to claim 1, wherein the process of sampling by the sampling module the electric signal to obtain the sampling result in S1 comprises:

sampling consecutively, by the sampling module, the electric signal for at least 3 times and taking an average of sampled voltages as the sampling result.

4. The method according to claim 3, wherein the process of obtaining the sampling result comprises:
S11: storing sampled voltage by the sampling module after each time performing the sampling and comparing the sampled voltage with each of stored voltages, obtaining the sampling result by calculating an average of the sampled voltages in a case that each difference value in the comparing is within a preset range; or discarding a voltage with a large change in a case that the difference values are not all within the preset range and performing S12; and
S12: judging whether number of sampling times exceeds a preset number of times, obtaining the sampling result by calculating an average of stored voltages in a case that the number of sampling times exceeds the preset number of times; or returning to S11 for continuing the sampling in a case that the number of sampling times does not exceed the preset number of times.

5. The method according to claim 1, wherein S3 comprises:
S301: judging, by the sampling module, whether a current sampling result is greater than a first preset voltage, recording the current optical signal status as a third status in a case that the current sampling result is greater than the first preset voltage; or performing S302 in a case that the current sampling result is not greater than the first preset voltage;
S302: judging, by the sampling module, whether the current sampling result is smaller than a second preset voltage, recording the current optical signal status as a first status in a case that the current sampling result is smaller than the second preset voltage; or performing S303 in a case that the current sampling result is not smaller than the second preset voltage; and
S303: analyzing, by the sampling module, a change trend of voltage according to the current result and the sampling results stored in the cache, recording the current optical signal status as a second status.

6. The method according to claim 5, wherein between S2 and S3 the method further comprises steps:
S21: judging, by the sampling module, whether the sampling result is greater than a maximum preset voltage, updating the maximum preset voltage with the sampling result and performing S23 in a case that the sampling result is greater than the maximum preset voltage; or performing S22 in a case that the sampling result is not greater than the maximum preset voltage;
S22: judging, by the sampling module, whether the sampling result is smaller than a minimum preset voltage, updating the minimum preset voltage with the sampling result and performing S23 in a case that the sampling result is smaller than the minimum preset voltage; or returning to S1 in a case that the sampling result is not smaller than the minimum preset voltage; and
S23: calculating, by the sampling module, the first preset voltage and the second preset voltage according to the minimum preset voltage and the maximum preset voltage and returning to S1.

7. The method according to claim 5, wherein codes corresponding to the first status, the second status and the third status are 0, 1, 2, respectively, wherein
the process of determining received data according to the current optical signal status and a stored optical status by the sampling module in S4 comprises: adding 3 to a code corresponding to the current optical signal status and subtracting a code corresponding to the stored optical signal status to obtain a difference; and performing mod 3 operation on the difference to obtain a remainder and then performing mod 2 operation on the remainder to obtain a result as the received data.

8. The method according to claim 5, wherein the process of determining received data according to the current optical signal status and a stored optical status by the sampling module in S4 comprises:
determining that the received data is 0 in a case that the process of converting from the stored optical signal status to the current optical status meets a first preset rule; and
determining that the received data is 1 in a case that the process of converting from the stored optical signal status to the current optical status meets a second preset rule;
wherein the first preset rule is that status changes cynically in an order of the third status, the second status, the first status and the third status; and a change order in the second preset rule is opposite to the change order in the first preset rule.

9. The method according to claim 1, wherein S3 comprises:
S311: judging, by the sampling module, whether a current sampling result is greater than a first preset voltage, recording the current optical signal status as a fifth status in a case that the current sampling result is greater than the first preset voltage; or performing S312 in a case that the current sampling result is not greater than the first preset voltage;
S312: judging, by the sampling module, whether the current sampling result is smaller than a second preset voltage, recording the current optical signal status as a first status in a case that the current sampling result is smaller than the second preset voltage; or performing S313 in a case that the current sampling result is not smaller than the second preset voltage;
S313: judging, by the sampling module, whether the current sampling result is greater than a fourth preset value, performing S314 in a case that the current sampling result is greater than the fourth preset value; or performing S315 in a case that the current sampling result is not greater than the fourth preset value;
S314: analyzing, by the sampling module, a change trend of voltage according to the current sampling result and other sampling results stored in the cache, recording the current optical signal status as the second status;
S315: judging, by the sampling module, whether the current sampling result is smaller than a third preset voltage, performing S316 in a case that the current sampling result is smaller than a third preset voltage; or performing S317 in a case that the current sampling result is not smaller than a third preset voltage;
S316: analyzing, by the sampling module, the change trend of voltage according to the current sampling result and other sampling results stored in the cache, recording the current optical signal status as a fourth status; and
S317: analyzing, by the sampling module, the change trend of voltage according to the current sampling result and other sampling results stored in the cache, recording the current optical signal status as a third status; or S3 comprises:
- S321: judging, by the sampling module, whether the current sampling result is greater than a first preset voltage, recording the current optical signal status as a fifth status in a case that the current sampling result is greater than a first preset voltage; or performing S322 in a case that the current sampling result is not greater than a first preset voltage;
- S322: judging, by the sampling module, whether the current sampling result is less than a second preset voltage, recording the current optical signal status as the first status in a case that the current sampling result is less than a second preset voltage; or performing S323 in a case that the current sampling result is not less than a second preset voltage;
- S323: analyzing, by the sampling module, the change trend of voltage according to the current sampling result and other sampling results stored in the cache, performing S324; and
- S324: judging, by the sampling module, a preset level value range in which the current sampling result falls, recording the current optical signal status as the fourth status in a case that the sampling result is between the second preset voltage and the third preset voltage; recording the current optical signal status as the third status in a case that the sampling result is between the third preset voltage and the fourth preset voltage; and recording the current optical signal status as the second status in a case that the sampling result is between the fourth preset voltage and the first preset voltage.

10. The method according to claim 5, wherein S4 comprises:
- S41: judging, by the sampling module, whether the current optical signal status is identical to the stored optical status, continuing the sampling of the electric signal and returning to S1 in a case that the current optical signal status is identical to the stored optical status; or performing S42 in a case that the current optical signal status is not identical to the stored optical status; and
- S42: obtaining, by the sampling module, the received data by calculating according to the code corresponding to the current optical status and a code corresponding to the stored optical signal status and sending the received data to the converting module; updating, by the sampling module, the stored optical signal status with the current optical signal status.

11. The method according to claim 9, wherein codes corresponding to the first status, the second status, the third status, the fourth status and the fifth status are 0, 1, 2, 3, 4, respectively;
wherein the process of determining received data by the sampling module according to the current optical signal status and the stored optical signal status comprises:
adding 4 to a code corresponding to current stored optical signal status and subtracting a code corresponding to the current optical signal status to obtain a difference; performing mod 5 operation on the difference to obtain a remainder and then performing mod 4 operation on the remainder to obtain a result;
determining that the received data is 00 in a case that the result is 0;
determining that the received data is 01 in a case that the result is 1;
determining that the received data is 10 in a case that the result is 2; and
determining that the received data is 11 in a case that the result is 3.

12. The method according to claim 9, wherein the process of determining the received data by the sampling module according to the current optical signal status and the stored optical signal status comprises:
detecting an interval between the stored optical signal status and the current optical signal status according to a first preset rule;
determining that the received data is 00 in a case that the stored optical signal status and the current optical signal status are adjacent;
determining that the received data is 01 in a case that the interval is 1; determining that the received data is 10 in a case that the interval is 2; and
determining that the received data is 11 in a case that the interval is 3;
wherein the first preset rule is that the status changes cyclically in an order of the fifth status, the fourth status, the second status, the first status and the fifth status according to the first preset rule.

13. The method according to claim 9, wherein between S2 and S3 the method further comprises steps:
- S21: judging, by the sampling module, whether the current sampling result is greater than the maximum preset voltage, updating the maximum preset voltage with the current sampling result and performing S23 in a case that the current sampling result is greater than the maximum preset voltage; or performing S22 in a case that the current sampling result is not greater than the maximum preset voltage;
- S22: judging, by the sampling module, whether the current sampling result is smaller than the minimum preset voltage, updating the minimum voltage with the sampling result and performing S23 in a case that the current sampling result is smaller than the minimum preset voltage; or performing S1 in a case that the current sampling result is not smaller than the minimum preset voltage; and
- S23: calculating, by the sampling module, to obtain the first preset voltage, the second preset voltage, the third preset voltage and the fourth preset voltage according to the maximum preset voltage and the minimum preset voltage and returning to S1.

14. The method according to claim 1, wherein
S8 comprises:
- S801: judging, by the converting module, whether a length of the data following the data head in the data storage space meets a preset value, performing S802 in a case that the length of the data following the data head in the data storage space meets the preset value; or ending the flow and returning to S1;
- S802: extracting, by the converting module, 8 bits of the data following the data head in the data storage space and obtaining a data bit length according to the extracted data;
- S803: judging, by the converting module, whether a length of the data after the data bit length in the data storage space is smaller than the data bit length, returning to S1 in a case that the length of the data after the data bit length in the data storage space is smaller than the data bit length; or performing S804 in a case that the length of the data after the data bit length in the data storage space is not smaller than the data bit length;

S804: obtaining, by the converting module, data of the data bit length after the data bit length in the data storage space; dividing the obtained data into groups of 4 bits and converting the groups into a decimal number to obtain valid data and check code; and S805: calculating, by the converting module, to obtain a check code according to the valid data and judging whether the calculated check code is identical to the received check code by comparison, wherein the data received from an output device is correct in a case that the calculated check code is identical to the received check code; or the data received from the output device is incorrect in a case that the calculated check code obtained is not identical to the received check code and the flow returns to S1 in a case that the calculated check code is not identical to the received check code; or S8 comprises:

S812: obtaining, by the converting module, data following the data head in the data storage space according to a preset data bit length and orderly dividing the obtained data into groups of 4 bits and converting the groups into a decimal number to obtain valid data and check code; and S813: calculating, by the converting module, to obtain a check code according to the valid data and judging whether the calculated check code is identical to the received check code, wherein the data received from the output device is correct in a case that the calculated check code obtained is identical to the received check code; or the received data is incorrect in a case that the calculated check code obtained is not identical to the received check code and the flow returns to S1.

15. An optical signal processing device, comprising a sampling module and a converting module, wherein the sampling module comprises:

a sampling unit, configured to sample an electric signal to obtain a sampling result and store the sampling result into a first storing unit;

the first storing unit, configured to store an optical signal status and the sampling result;

a first judging unit, configured to judge whether a number of the sampling results stored in the first storing unit is greater than a preset value, wherein in a case that the number of the sampling results stored in the first storing unit is greater than a preset value, a first determining unit starts working; otherwise, the sampling unit continues sampling;

the first determining unit, configured to determine a current optical signal status of an output apparatus according to a current sampling result;

a second determining unit, configured to determine received data according to the current optical signal status and the optical signal status stored in the first storing unit and update the stored optical signal status with the current optical signal status; and a sending unit, configured to send the received data to the converting module; and wherein the converting module comprises:

a receiving unit, configured to receive data sent by the sending unit of the sampling module;

a second storing unit, configured to store the data received by the receiving unit;

a second judging unit, configured to determine whether there exists a qualified data head in the second storing unit, wherein in a case that there exists a qualified data head in the second storing unit, a recording unit starts working; otherwise, the sampling unit continues sampling;

the recording unit, configured to record a position of the qualified data head; and a verifying unit, configured to verify whether the data following the qualified data head in the second storing unit is legitimate, wherein in a case that the data following the qualified data head in the second storing unit is legitimate, the received data is correct and flow is ended; otherwise, the received data is incorrect and the sampling unit continues sampling.

16. The device according to claim 15, wherein the converting module further comprises a third judging unit configured to judge whether the receiving unit receives the data sent by the sending unit of the sampling module.

17. The device according to claim 15, wherein the first determining unit determines the current optical signal status of the output apparatus according to a voltage interval where the sampling result is in and a change trend of the sampling result.

18. The device according to claim 15, wherein each optical signal status corresponds to a code; and wherein the second determining unit is configured to perform mod operation on a code corresponding to the current optical signal status and a code corresponding to the stored optical signal to determine the received data;

or the second determining unit is configured to determine the received data according to a rule satisfied in the process of converting from the stored optical signal status to the current optical signal status.

19. The device according to claim 15, wherein the verifying unit comprises:

an obtaining and converting sub-unit, configured to obtain data of a data bit length from a data following the qualified data head in the second storing unit, divide the obtained data into groups of 4 bits orderly and convert the groups into a decimal number to obtain valid data and check code;

a calculating and comparing sub-unit, configured to calculate a check code according to the valid data and judge whether the calculated check code and the received check code are identical, wherein in a case that the calculated check code and the received check code are identical, the data received by a terminal from the output apparatus is correct; otherwise, the data received by the terminal is incorrect and the sampling module continues sampling;

a first judging sub-unit, configured to judge whether the length of the data following the qualified data head in the second storing unit meets a preset value, wherein in a case that the length of the data following the qualified data head in the second storing unit meets a preset value, an extracting sub-unit works; otherwise, the sampling unit continues sampling;

the extracting sub-unit, configured to extract 8 bits of data following the qualified data head in the second storing unit and obtain the data bit length according to the extracted data;

the second judging sub-unit, configured to judge whether a length of the data after the data bit length in the second storing unit is smaller than the data bit length, wherein in a case that the length of the data after the data bit length in the second storing unit is smaller than the data bit length, the sampling unit continues sampling, otherwise, the obtaining and converting sub-unit starts working; and the obtaining and converting sub-unit, configured to obtain data of the data bit length after the data bit length in the second storing unit, divide the obtained data into groups of 4 bits orderly and convert the data into decimal number to obtain valid data and check code.

* * * * *